United States Patent
Snyder et al.

(10) Patent No.: US 8,282,001 B2
(45) Date of Patent: Oct. 9, 2012

(54) METHOD FOR DATA INTERCHANGE

(75) Inventors: David M. Snyder, Cedar Rapids, IA (US); Bruce D. Melick, Cedar Rapids, IA (US); Leslie D. Baych, Cedar Rapids, IA (US); Paul R. Staman, Amana, IA (US); Nicholas J. Peters, Williamsburg, IA (US); Gregory P. Probst, Iowa City, IA (US)

(73) Assignee: Roelesis Wireless LLC, Dover, DE (US)

( * ) Notice: Subject to any disclaimer, the term of this patent is extended or adjusted under 35 U.S.C. 154(b) by 16 days.

(21) Appl. No.: 13/023,767

(22) Filed: Feb. 9, 2011

(65) Prior Publication Data
US 2011/0130129 A1 Jun. 2, 2011

Related U.S. Application Data

(63) Continuation of application No. 11/550,297, filed on Oct. 17, 2006, now Pat. No. 7,942,328, which is a
(Continued)

(51) Int. Cl.
*G06K 7/10* (2006.01)
*G06K 19/06* (2006.01)

(52) U.S. Cl. .................. 235/462.01; 235/492
(58) Field of Classification Search ............... 235/492, 235/375, 379–382, 384, 462.01
See application file for complete search history.

(56) References Cited

U.S. PATENT DOCUMENTS
4,175,693 A  11/1979 Nakanishi et al.
(Continued)

FOREIGN PATENT DOCUMENTS
JP  406089362  3/1994
(Continued)

OTHER PUBLICATIONS

"Choosing a Bar Code," http://www.elfring.com/barcode.htm. 4 pgs. [accessed on Dec. 23, 1999].
(Continued)

*Primary Examiner* — Thien M. Le
*Assistant Examiner* — April Taylor
(74) *Attorney, Agent, or Firm* — Perkins Coie LLP

(57) ABSTRACT

A method for data interchange includes summing up data associated with an electronic document to provide summed up data, representing the summed up data as one or more bar codes, and returning the one or more bar codes for display and data capture via a bar code scan from either a video display or a printed version of the one or more bar codes. The electronic document may be of any number of formats. The summing up may include taking data from multiple information fields to create the summed up data. The data may include data tags or a step of adding data tags to the data to assist in data interchange may be performed.

20 Claims, 10 Drawing Sheets

Related U.S. Application Data

(63) continuation-in-part of application No. 11/532,557, filed on Sep. 18, 2006, now Pat. No. 7,337,948, which is a continuation of application No. 11/325,713, filed on Jan. 5, 2006, now Pat. No. 7,118,040, which is a continuation-in-part of application No. 11/131,853, filed on May 18, 2005, now Pat. No. 7,150,400, which is a continuation-in-part of application No. 11/015,635, filed on Dec. 17, 2004, now Pat. No. 7,350,708, and a continuation-in-part of application No. 10/847,994, filed on May 18, 2004, now Pat. No. 7,267,279, which is a continuation of application No. 10/158,718, filed on May 30, 2002, now Pat. No. 6,764,009, which is a continuation of application No. 09/753,863, filed on Jan. 3, 2001, now Pat. No. 7,070,103.

(60) Provisional application No. 60/294,375, filed on May 30, 2001, provisional application No. 60/232,825, filed on Sep. 15, 2000, provisional application No. 60/213,843, filed on Jun. 23, 2000, provisional application No. 60/174,220, filed on Jan. 3, 2000, provisional application No. 60/572,140, filed on May 18, 2004, provisional application No. 60/727,605, filed on Oct. 18, 2005, provisional application No. 60/813,899, filed on Jun. 15, 2006, provisional application No. 60/834,523, filed on Aug. 1, 2006.

(56) References Cited

U.S. PATENT DOCUMENTS

| | | |
|---|---|---|
| 4,352,012 A | 9/1982 | Verderber et al. |
| 4,481,412 A | 11/1984 | Fields |
| 4,511,259 A | 4/1985 | Horiuchi |
| 4,731,525 A | 3/1988 | Hice |
| 4,752,675 A | 6/1988 | Zetmeir |
| 4,791,281 A | 12/1988 | Johnsen et al. |
| 4,877,948 A | 10/1989 | Krueger |
| 4,902,883 A | 2/1990 | Poland |
| 5,025,397 A | 6/1991 | Suzuki |
| 5,113,445 A | 5/1992 | Wang |
| 5,159,180 A | 10/1992 | Feiler |
| 5,159,635 A | 10/1992 | Wang |
| 5,178,417 A | 1/1993 | Eshoo |
| 5,227,893 A | 7/1993 | Ett |
| 5,245,655 A | 9/1993 | Buhn et al. |
| 5,287,434 A | 2/1994 | Bain et al. |
| 5,315,093 A | 5/1994 | Stewart |
| 5,331,137 A | 7/1994 | Swartz |
| 5,363,214 A | 11/1994 | Johnson |
| 5,369,571 A | 11/1994 | Metts |
| 5,379,345 A | 1/1995 | Greenberg |
| 5,420,943 A | 5/1995 | Mak |
| 5,436,437 A | 7/1995 | Ho |
| 5,451,760 A | 9/1995 | Renvall |
| 5,453,600 A | 9/1995 | Swartz |
| 5,455,414 A | 10/1995 | Wang |
| 5,468,945 A | 11/1995 | Huggett et al. |
| 5,489,763 A | 2/1996 | Conrad et al. |
| 5,490,217 A | 2/1996 | Wang et al. |
| 5,506,697 A | 4/1996 | Li et al. |
| 5,563,399 A | 10/1996 | Wang |
| 5,579,537 A | 11/1996 | Takahisa |
| 5,594,230 A | 1/1997 | Waite et al. |
| 5,602,377 A | 2/1997 | Beller et al. |
| 5,644,408 A | 7/1997 | Li et al. |
| 5,659,164 A | 8/1997 | Schmid et al. |
| 5,665,953 A | 9/1997 | Mazzamuto et al. |
| 5,682,030 A | 10/1997 | Kubon |
| 5,684,288 A | 11/1997 | Renvall |
| 5,760,382 A | 6/1998 | Li et al. |
| 5,781,914 A | 7/1998 | Stork et al. |
| 5,796,090 A | 8/1998 | Pavlidis et al. |
| 5,804,803 A | 9/1998 | Cragun et al. |
| 5,805,152 A | 9/1998 | Furusawa |
| 5,812,664 A | 9/1998 | Bernobich et al. |
| 5,825,009 A | 10/1998 | Schmid et al. |
| 5,841,116 A | 11/1998 | Lewis |
| 5,848,202 A | 12/1998 | D'Eri et al. |
| 5,848,292 A | 12/1998 | Nathan |
| 5,848,426 A | 12/1998 | Wang et al. |
| 5,872,589 A | 2/1999 | Morales |
| 5,883,370 A | 3/1999 | Walker et al. |
| 5,933,829 A | 8/1999 | Durst et al. |
| 5,939,699 A | 8/1999 | Perttunen et al. |
| 5,974,202 A | 10/1999 | Wang et al. |
| 5,979,762 A | 11/1999 | Bianco |
| 6,002,491 A | 12/1999 | Li et al. |
| 6,015,088 A | 1/2000 | Parker et al. |
| 6,015,167 A | 1/2000 | Savino et al. |
| 6,024,284 A | 2/2000 | Schmid et al. |
| 6,024,289 A | 2/2000 | Ackley |
| 6,031,621 A | 2/2000 | Binder |
| 6,036,094 A | 3/2000 | Goldman et al. |
| 6,039,252 A | 3/2000 | Maltsev |
| 6,041,374 A | 3/2000 | Postman et al. |
| 6,056,195 A | 5/2000 | Spain |
| 6,082,620 A | 7/2000 | Bone, Jr. |
| 6,095,418 A | 8/2000 | Swartz et al. |
| 6,102,289 A | 8/2000 | Gabrielson |
| 6,108,656 A | 8/2000 | Durst et al. |
| 6,138,906 A | 10/2000 | DeMayo |
| 6,148,331 A | 11/2000 | Parry |
| 6,149,059 A | 11/2000 | Ackley |
| 6,189,009 B1 | 2/2001 | Stratigos et al. |
| 6,230,143 B1 | 5/2001 | Simons et al. |
| 6,260,762 B1 | 7/2001 | Lohmann |
| 6,289,111 B1 | 9/2001 | Takhar |
| 6,289,323 B1 | 9/2001 | Gordon et al. |
| 6,299,063 B1 | 10/2001 | Freeman |
| 6,338,434 B1 | 1/2002 | Wilz, Sr. et al. |
| 6,356,923 B1 | 3/2002 | Yano et al. |
| 6,386,453 B1 | 5/2002 | Russell et al. |
| 6,389,182 B1 | 5/2002 | Ihara et al. |
| 6,394,356 B1 | 5/2002 | Zagami |
| 6,427,032 B1 | 7/2002 | Irons et al. |
| 6,429,776 B1 | 8/2002 | Alicot et al. |
| 6,464,133 B1 | 10/2002 | Gruber |
| 6,464,140 B1 | 10/2002 | Weigel |
| 6,540,138 B2 | 4/2003 | Hall et al. |
| 6,540,143 B1 | 4/2003 | Matsumori |
| 6,568,596 B1 | 5/2003 | Shaw |
| 6,587,835 B1 * | 7/2003 | Treyz et al. ............... 705/14.64 |
| 6,616,056 B2 | 9/2003 | Cato |
| 6,631,843 B2 | 10/2003 | Schuessler |
| 6,647,257 B2 * | 11/2003 | Owensby .................. 455/414.1 |
| 6,666,377 B1 | 12/2003 | Harris |
| 6,668,293 B2 | 12/2003 | Chen et al. |
| 6,669,087 B2 | 12/2003 | Wiklof et al. |
| 6,674,924 B2 | 1/2004 | Wright et al. |
| 6,685,094 B2 | 2/2004 | Cameron |
| 6,707,581 B1 | 3/2004 | Browning |
| 6,729,547 B1 | 5/2004 | Charlier et al. |
| 6,749,120 B2 | 6/2004 | Hung et al. |
| 6,758,391 B1 | 7/2004 | Pickens, III |
| 6,764,009 B2 | 7/2004 | Melick et al. |
| 6,772,947 B2 | 8/2004 | Shaw |
| 6,772,950 B2 | 8/2004 | He |
| 6,793,127 B2 | 9/2004 | Alsafadi et al. |
| 6,799,717 B2 | 10/2004 | Harris |
| 6,826,548 B2 | 11/2004 | Hungerpiller et al. |
| 6,854,651 B2 | 2/2005 | Smith et al. |
| 6,865,284 B2 | 3/2005 | Mahoney et al. |
| 6,886,750 B2 | 5/2005 | Rathus et al. |
| 6,915,957 B2 | 7/2005 | Kisliakov |
| 6,948,068 B2 | 9/2005 | Lawandy et al. |
| 7,070,103 B2 | 7/2006 | Melick et al. |
| 7,118,040 B2 | 10/2006 | Melick et al. |
| 7,257,202 B2 | 8/2007 | Umemura et al. |
| 7,267,279 B2 | 9/2007 | Melick et al. |
| 7,337,948 B2 | 3/2008 | Melick et al. |

| | | |
|---|---|---|
| 7,337,971 B2 | 3/2008 | Melick et al. |
| 7,341,456 B2 | 3/2008 | McAdams et al. |
| 7,350,708 B2 | 4/2008 | Melick et al. |
| 7,387,250 B2 | 6/2008 | Muni |
| 7,419,097 B2 | 9/2008 | Lee et al. |
| 7,537,162 B1 * | 5/2009 | Siu .................. 235/462.01 |
| 7,548,610 B2 * | 6/2009 | Sierra et al. .......... 379/88.01 |
| 7,573,604 B2 | 8/2009 | Hull et al. |
| 7,628,318 B2 | 12/2009 | Melick et al. |
| 7,747,655 B2 | 6/2010 | Hull et al. |
| 7,798,417 B2 | 9/2010 | Snyder et al. |
| 2001/0003178 A1 | 6/2001 | Chen et al. |
| 2001/0006189 A1 | 7/2001 | Ruby |
| 2001/0011233 A1 | 8/2001 | Narayanaswami |
| 2001/0011276 A1 | 8/2001 | Durst Jr. et al. |
| 2001/0030234 A1 | 10/2001 | Wiklof |
| 2001/0034222 A1 | 10/2001 | Roustaei et al. |
| 2001/0037297 A1 | 11/2001 | McNair |
| 2001/0037397 A1 | 11/2001 | Boucher et al. |
| 2001/0042791 A1 | 11/2001 | Postlewaite |
| 2001/0045461 A1 | 11/2001 | Schuessler |
| 2001/0054082 A1 | 12/2001 | Rudolph et al. |
| 2002/0006786 A1 | 1/2002 | Mine |
| 2002/0023027 A1 | 2/2002 | Simonds |
| 2002/0059241 A1 | 5/2002 | Van Ryzin |
| 2002/0063903 A1 | 5/2002 | Claviez-Homberg |
| 2002/0064903 A1 | 5/2002 | Kawata et al. |
| 2002/0074399 A1 | 6/2002 | Hall et al. |
| 2002/0097426 A1 | 7/2002 | Gusmano et al. |
| 2002/0105424 A1 | 8/2002 | Alicot et al. |
| 2002/0165931 A1 | 11/2002 | Greer et al. |
| 2002/0181804 A1 | 12/2002 | Simpson et al. |
| 2002/0195495 A1 | 12/2002 | Melick et al. |
| 2003/0001017 A1 | 1/2003 | Konda |
| 2003/0009350 A1 | 1/2003 | Melick et al. |
| 2003/0019935 A1 | 1/2003 | Giannulli |
| 2003/0019939 A1 | 1/2003 | Sellen |
| 2003/0042312 A1 | 3/2003 | Cato |
| 2003/0042313 A1 | 3/2003 | Kahn et al. |
| 2003/0089764 A1 | 5/2003 | Meadow et al. |
| 2003/0127517 A1 | 7/2003 | Couvelaere et al. |
| 2003/0141368 A1 | 7/2003 | Pascual et al. |
| 2003/0169456 A1 | 9/2003 | Suzaki |
| 2003/0179908 A1 | 9/2003 | Mahoney et al. |
| 2003/0182242 A1 | 9/2003 | Scott et al. |
| 2003/0197062 A1 | 10/2003 | Shaw |
| 2003/0216960 A1 * | 11/2003 | Postrel .................. 705/14 |
| 2003/0226885 A1 | 12/2003 | Harris |
| 2003/0229678 A1 | 12/2003 | Wen et al. |
| 2003/0230630 A1 | 12/2003 | Whipple et al. |
| 2003/0236680 A1 | 12/2003 | Holoubek |
| 2004/0010604 A1 | 1/2004 | Tanaka et al. |
| 2004/0035922 A1 | 2/2004 | Cameron |
| 2004/0035925 A1 | 2/2004 | Wu et al. |
| 2004/0039634 A1 | 2/2004 | Cook |
| 2004/0039661 A1 * | 2/2004 | Fuzell-Casey et al. ....... 705/27 |
| 2004/0059462 A1 | 3/2004 | Norris et al. |
| 2004/0073495 A1 | 4/2004 | Calaway et al. |
| 2004/0099741 A1 | 5/2004 | Dorai et al. |
| 2004/0117255 A1 | 6/2004 | Nemirofsky et al. |
| 2004/0117638 A1 | 6/2004 | Monroe |
| 2004/0120016 A1 | 6/2004 | Burke |
| 2004/0120547 A1 | 6/2004 | Mampe et al. |
| 2004/0176978 A1 | 9/2004 | Simon et al. |
| 2004/0177003 A1 | 9/2004 | Liao et al. |
| 2004/0206820 A1 | 10/2004 | Melick et al. |
| 2005/0015310 A1 | 1/2005 | Frantz et al. |
| 2005/0029354 A1 | 2/2005 | Frantz et al. |
| 2005/0029358 A1 | 2/2005 | Mankins |
| 2005/0044179 A1 | 2/2005 | Hunter |
| 2005/0061887 A1 | 3/2005 | Garrison et al. |
| 2005/0082370 A1 | 4/2005 | Frantz et al. |
| 2005/0098632 A1 | 5/2005 | Turvy et al. |
| 2005/0150944 A1 | 7/2005 | Melick et al. |
| 2005/0173524 A1 | 8/2005 | Schrader |
| 2005/0224571 A1 | 10/2005 | Kelley et al. |
| 2005/0272442 A1 * | 12/2005 | Miller et al. .............. 455/456.1 |
| 2006/0095795 A1 | 5/2006 | Nakamura et al. |
| 2006/0108422 A1 | 5/2006 | Melick et al. |
| 2006/0124724 A1 | 6/2006 | Kotovich et al. |
| 2007/0075861 A1 | 4/2007 | Cook et al. |
| 2007/0119954 A1 | 5/2007 | Barenburg et al. |
| 2007/0138289 A1 | 6/2007 | Melick et al. |
| 2007/0145138 A1 | 6/2007 | Snyder et al. |
| 2007/0193095 A1 | 8/2007 | Eisenberg |
| 2007/0248275 A1 | 10/2007 | Tabesh et al. |
| 2008/0017714 A1 | 1/2008 | Melick et al. |
| 2008/0017722 A1 | 1/2008 | Snyder et al. |
| 2008/0105747 A1 | 5/2008 | Orlassino |
| 2008/0116282 A1 | 5/2008 | Sharra et al. |
| 2008/0141117 A1 | 6/2008 | King et al. |
| 2008/0151302 A1 | 6/2008 | Lee |
| 2008/0176543 A1 | 7/2008 | Gravel et al. |
| 2008/0296393 A1 | 12/2008 | Jovanovski et al. |
| 2009/0204530 A1 | 8/2009 | Hanson |
| 2010/0096448 A1 | 4/2010 | Melick et al. |
| 2011/0040624 A1 * | 2/2011 | Jhanji ................. 705/14.57 |

FOREIGN PATENT DOCUMENTS

JP          2003157093 A     5/2003

OTHER PUBLICATIONS

"PSC Momentum Scanner and Handspring Visor," http://www.psnet.com/momenvsr.htm, pp. 1-2 [accessed on Dec. 27, 2000].

Final Office Action for U.S. Appl. No. 11/550,297; Mailed on Oct. 7, 2010; 8 pages.

Hand Held Bar Code Scanner, Scan Plus 1800 by Intermec Technologies Corporation, 1998, pp. 1-2.

Marsh, D., "Temporal Rate Conversion," http://www.microsoft.com/hwdev/TVBROADCAST/TempRate1.htm, pp. 1-20 [accessed on Dec. 27, 2000].

Motorola, Symbol Technologies, Connect Things and Airclic Form New Company to Drive the Growth of E-Commerce Through One-Scan Access to the Internet by Symbol, Jun. 15, 2000, pp. 1-4.

Non-Final Office Action for U.S. Appl. No. 11/550,297; Mailed on Mar. 31, 2010; 37 pages.

Non-Final Office Action for U.S. Appl. No. 11/832,482; Mailed on Oct. 5, 2009; 35 pages.

Non-Final Office Action for U.S. Appl. No. 12/580,182; Mailed on Jul. 30, 2010; 6 pages.

WelchAllyn Scanteam 3400 Series User's Guide, 1998, 27 pages.

International Search Report and Written Opinion; PCT Application No. PCT/US2008/071518; Applicant: Tripletail Ventures, Inc.; Date of Mailing: Apr. 12, 2008, 14 pages.

* cited by examiner

RECEIVER OF DOCUMENT "B"

SUBJECT: STYLE SHEET TO EXCHANGE CUSTOMERS AND AGE DEMOGRAPHICS

STYLE SHEET ID    12345

F01 = FIRST NAME
F02 = LAST NAME
F03 = AGE
F04 =
F05 =
F06 =
F07 =
F08 =
F09 =
F10 =
F11 =
F12 =

*Fig. 3*

MY OWN STYLE SHEET FOR ELECTRONIC DOCUMENT "B"

SUBJECT: STYLE SHEET TO EXCHANGE CUSTOMERS AND AGE DEMOGRAPHICS

STYLE SHEET ID    45678

F01 = AGE
F02 = LAST NAME
F03 = FIRST NAME
F04 =
F05 =
F06 =
F07 =
F08 =
F09 =
F10 =
F11 =
F12 =

ANSI 6360180101DL 28 4DL
DABSMITH
DACJOHN
DADDARRELL
DANCEDAR RAPIDS
DAOIA
DAP52411

*Fig. 8*

METHOD FOR DATA INTERCHANGE

CROSS-REFERENCE TO RELATED APPLICATIONS

This application is a continuation application of U.S. patent application Ser. No. 11/550,297 filed on Oct. 17, 2006, which is a continuation-in-part of U.S. patent application Ser. No. 11/015,635 filed on Dec. 17, 2004 (now U.S. Pat. No. 7,350,708), which is a continuation-in-part of U.S. patent application Ser. No. 09/753,863 filed on Jan. 3, 2001 (now U.S. Pat. No. 7,070,103) and is a continuation-in-part of U.S. patent application Ser. No. 10/847,994 filed on May 18, 2004 (now U.S. Pat. No. 7,267,279), which is a continuation of U.S. patent application Ser. No. 10/158,718 filed on May 30, 2002 (now U.S. Pat. No. 6,764,009).

This application is a continuation of U.S. patent application Ser. No. 11/550,297 filed on Oct. 17, 2006, which is a continuation-in-part of U.S. patent application Ser. No. 10/847,994 filed on May 18, 2004 (now U.S. Pat. No. 7,267,279), which is a continuation of U.S. patent application Ser. No. 10/158,718 filed on May 30, 2002 (now U.S. Pat. No. 6,764,009), which claims the benefit of provisional U.S. Patent Application No. 60/294,375 filed on May 30, 2001.

This application is a continuation of U.S. patent application Ser. No. 11/550,297 filed on Oct. 17, 2006, which is a continuation-in-part of U.S. patent application Ser. No. 11/532,557 filed on Sep. 18, 2006, now U.S. Pat. No. 7,337,948 which is a continuation of U.S. patent application Ser. No. 11/325,713 filed on Jan. 5, 2006 (now U.S. Pat. No. 7,118,040), which is a continuation of U.S. patent application Ser. No. 09/753,863 filed on Jan. 3, 2001 (now U.S. Pat. No. 7,070,103), which claims the benefit of provisional U.S. Patent Application No. 60/232,825 filed on Sep. 15. 2000, claims the benefit of provisional U.S. Patent Application No. 60/213,843 filed on Jun. 23, 2000, and claims the benefit of provisional U.S. Patent Application No. 60/174,220 filed on Jan. 3, 2000.

This application is a continuation of U.S. patent application Ser. No. 11/550,297 filed on Oct. 17, 2006, which is a continuation-in-part of U.S. patent application Ser. No. 11/325,713 filed on Jan. 5, 2006, now U.S. Pat. No. 7,118,040 which is a continuation of U.S. patent application Ser. No. 09/753,863 filed on Jan. 3, 2001 (now U.S. Pat. No. 7,070,103), which claims the benefit of provisional U.S. Patent Application No. 60/232,825 filed on Sep. 15, 2000, claims the benefit of provisional U.S. Patent Application No. 60/213,843 filed on Jun. 23, 2000, and claims the benefit of provisional U.S. Patent Application No. 60/174,220 filed on Jan. 3, 2000.

This application is a continuation of U.S. patent application Ser. No. 11/550,297 filed on Oct. 17, 2006, which is continuation-in-part of U.S. patent application Ser. No. 11/131,853 filed on May 18, 2005 (now U.S. Pat. No. 7,150,400) and claims the benefit of provisional U.S. Patent Application No. 60/572,140 filed on May 18, 2004.

This application is a continuation of U.S. patent application Ser. No. 11/550,297, filed on Oct. 17, 2006, which claims the benefit of provisional U.S. Patent Application No. 60/727,605 filed on Oct. 18, 2005.

This application is a continuation of U.S. patent application Ser. No. 11/550,297, filed on Oct. 17, 2006, which claims the benefit of provisional U.S. Patent Application No. 60/813,899 filed on Jun. 15, 2006.

This application is a continuation of U.S. patent application Ser. No. 11/550,297 filed on Oct. 17, 2006, which claims the benefit of provisional U.S. Patent Application No. 60/834,523 filed on Aug. 1, 2006.

All applications listed above are hereby incorporated by reference in their entireties.

BACKGROUND OF THE INVENTION

1. Field of the Invention

The present invention relates generally to data interchange technology, and more particularly, though not exclusively, to a method and apparatus for inputting tagged or un-tagged data into electronic documents (e-forms), summing up data in the electronic document, or in a linked and separate document or file as one or more 1D and/or 2D bar codes ready for use in data interchange.

2. Problems in the Art

Electronic data interchange (EDI) is the application-to-application electronic exchange of business data found in invoices, purchase orders and dozens of other business transactions. Data destined for EDI transmission is initially entered into a computer, usually by a keyboard or through an Auto ID system using bar codes, radio frequency identification (RFID), magnetic stripe; optical character recognition (OCR), etc.

EDI reduces lead times and inventory levels, improves bidirectional information accuracy, reduces management costs and improves the quality of products and services.

Electronic Data Interchange (EDI) between different software applications running on disparate computer operating systems is not easy to accomplish. Currently, EDI has a relatively low adoption level, and is limited mainly to large companies. Standards for EDI are still under discussion and are expected to evolve slowly. As a result, users must have applications that can extract data from internal systems, format this data into EDI transaction sets, and partners must be capable of using these formats. Accomplishing this generally requires negotiation to determine the level of interaction between the parties exchanging information, security, and issues like timing of communications.

Currently, custom EDI applications use sophisticated computer software such as IBM DB2, Oracle, Microsoft SQL Server, or other programs, commonly referred to as middleware, in computer to computer data interchange applications. This middleware is expensive and requires a trained computer programmer to establish and maintain the data transfer links. Furthermore, middleware is not flexible. As business trading partners and suppliers change, and/or the format of data storage is modified in a host computer, the service of a trained computer programmer is required to maintain the data interchange capabilities. It is therefore desirable to minimize the amount of middleware software required.

Major retailers such as Sears, Wal-Mart, and Dayton Hudson have all but excluded small suppliers due to their EDI requirements. Small companies that do not possess the infrastructure and/or volume to justify EDI investments have essentially been excluded by major companies as trading partners. This has raised an interesting dilemma for business: whether to allow system constraints to drive business practices or to allow business practices to drive systems.

Bar codes were first introduced in the United States in the late 1960s. Bar code technology allows almost any data to be collected rapidly and with almost perfect accuracy. Bar code technology provides a simple and easy method of data collection by encoding text information that is easily read by many different stationary, and/or inexpensive hand held electronic devices. Bar codes have become the standard method of identification, processing, and management used universally throughout the manufacturing, retail, and distribution industries. While the utilization of this technology has been limited to printed media, similar needs exist for capturing, storing, and interchanging data using a digital medium.

The age of the Internet, along with an increasing dependence on external business partners for sales and marketing, distribution and processing have given rise to complex issues surrounding information storage, retrieval, and exchange. These issues are compounded by the lack of an efficient, universal means by which to exchange data across disparate platforms and operating systems used in business today.

While there are obvious reasons to maintain a closed network/system (virtual private network) for operational and proprietary purposes, these same systems limit flexibility in the universal exchange of data. Further complicating this issue is the integration of new suppliers, customers, service providers and distributors into these networks, where the convergence of data is critical.

Legacy systems have historically posed challenges for organizations, being both expensive and inefficient for data migration. Drafting complex software solutions for conversions has been and will continue to be an ongoing obstacle. In the convergence process, hardware incompatibilities may also create unique considerations.

One of the largest challenges companies face today is addressing their technology needs to enable business-to-business (B2B) and business-to-consumer (B2C) initiatives. Traditional electronic data interchange (EDI) methods have been largely unaffordable and have left most companies on the sidelines due to the costs associated with such systems. Yet, according to a recent Jupiter Research Report, 70% of companies rank "moving online" as their top priority going forward. System Integrators (SI's) have been aggressively developing commercial applications to address these needs, however research analysts agree that most of these efforts are too expensive and lack the flexibility necessary to enable broad based alternatives to Web EDI.

The underlying problem will continue to be how to deal with hundreds of different data standards, platforms, and operating systems. Some of the most basic aspects of enabling electronic commerce are data capture, integration, and personalization capabilities. These considerations, along with the ongoing needs associated with access to data, anywhere, and at anytime, have resulted in a proliferation of new techniques and devices to satisfy these needs. While considerable advancements have been made in this regard, barriers continue to exist that limit the universal access and exchange of information.

B2B and B2C electronic commerce is predicated on sophisticated middle-ware, third-party administrators and in some cases the physical re-entry of information. Sophisticated computer software such as IBM DB2, Oracle, Microsoft SQL Server, referred to as middle-ware, is required for computer-to-computer data interchange applications. These techniques are both expensive, lack flexibility and subject to considerable human error.

Another form of EDI is Optical Character Recognition (OCR). This technology has been employed to speed the collection of human readable data, in the form of handwriting, from scanned paper forms. Even though OCR speeds the data collection process, it is still an expensive method due to the error-checking required to insure that correct data has been captured and input. Also, OCR is limited in its ability to be a widely adopted EDI technology.

Optical character recognition (OCR) was one of the earliest Auto ID technologies used in retail applications in the mid-1980's. Today, OCR is currently part of resurgence because of improved reading equipment that is much more accurate, and recognizes a wider range of type styles than earlier equipment.

OCR is typically used to read selected areas of text (as opposed to text recognition software that process full pages of text). OCR is both human- and machine-readable and suited for use with account numbers or short data strings.

OCR readers scan the data in much the same way bar code scanners do: either by moving the document past the scanner or moving the scanner over the document. The scan produces a "picture" of the text that is then analyzed for characteristic features. Features are then matched to specific letters or numbers for output.

It should be noted that OCR readers do not work the same way as vision systems do. The equipment for text string scanning is much simpler and less expensive that vision systems or text scanners.

Another OCR technology is magnetic ink character recognition (MICR). MICR like OCR has a narrow range of usefulness as an EDI system that can be widely adopted.

Another OCR technology is intelligent character recognition (ICR). ICR is the intelligent recognition of non-OCR font characters, and hand-printed characters. ICR like OCR and MICR has a narrow range of usefulness as an EDI system that can be widely adopted.

Wireless devices in the form of cellular phones, PDA's, pager's, etc. have equipped consumers with additional functionality; however barriers have become more complex between such devices and their various operating platforms and software applications. In addition, these devices do not provide for an easy-to-use, two-way interactive means by which to access and interchange data.

To achieve the desired flexibility and speed in capturing, storing, and interchanging data, businesses and consumers continue to deal with increasingly complex integration issues with management information systems.

Some of these issues have recently been solved by leveraging the proven ability of bar codes as an easy, point-of-use method for capturing and exchanging data, where computing devices may share the same data sources seamlessly and easily. More importantly, these methods enable small to medium size companies with electronic commerce capabilities without the need to build infrastructure, or to develop sophisticated middle-ware solutions.

Another form of EDI that is becoming more prevalent is eXtensible Markup Language (XML). XML is an open standard that is a subset of SGML (Standardized General Markup Language). XML was developed to overcome the shortcomings of HTML (Hypertext Markup Language) which much of the data on the Internet is tagged in. One of the shortcomings of XML is both ends of the EDI transaction must support the import and export of XML documents. XML is neither easy nor cheap to implement. To use XML efficiently, it is not simply a matter of adding XML to existing software processes, but instead will require re-engineering. The most difficult problem which restricts easy and widespread XML implementations is the ability to easily interface data into a legacy system via an Internet web browser.

Many large businesses have positioned themselves to conduct business online, but due to the costs and complexity associated with electronic commerce, their vendors have not been quick to follow. Given the cost savings benefits of online businesses, these companies will be more willing to find new suppliers and trading partners online rather than by traditional means.

During the past decade, acquisitions and mergers have also escalated at a rapid pace as more and more companies posture for a piece of international trade. As economies continue to open, companies will continue to aggressively pursue strategic alliances to capitalize on these opportunities. To date, an overriding consideration in such alliances has been complex conversion and information exchange issues. While the Internet has done much to free the information flow, the compatibility of legacy hardware and software remains paramount.

Another limitation of e-Forms is they have been limited to HTML, XML, or PDF formats or a few proprietary formats.

There is therefore an unfilled need for a method and apparatus which solves these and other problems. This invention has as its primary objective fulfillment of this need. The present invention is not, however, to be limited in any way by this discussion.

FEATURES OF THE INVENTION

A general feature of the present invention is the provision of a method and apparatus for tagged bar code data interchange which overcomes the problems found in the prior art.

A further feature of the present invention is the provision of a method for data interchange using tagged printed and/or video displayed bar codes which uses XML as an ad hoc middleware.

Another feature of the present invention is the provision of a method for data interchange between computers using different operating systems using tagged printed and/or video bar codes.

A further feature of the present invention is the provision of a method for data interchange between computers using different computer software applications using tagged printed and/or video bar codes.

Another feature of the present invention is a method for data interchange using tagged video bar codes generated by a software application running within, or in conjunction with an electronic document, to represent data contained therein.

Another feature of the present invention is a method for data interchange using tagged printed bar codes generated by a software application running within, or in conjunction with an electronic document, to represent data contained therein.

Another feature of the present invention is the provision of a method and apparatus for data interchange using tagged video bar codes for business-consumer transactions.

Another feature of the present invention is the provision of a method and apparatus for data interchange using tagged printed bar codes for business-consumer transactions.

Another feature of the present invention is the provision of a method and apparatus for data interchange using tagged video bar codes for consumer-consumer transactions.

Another feature of the present invention is the provision of a method and apparatus for data interchange using tagged printed bar codes for consumer-consumer transactions.

Another feature of the present invention is the provision of a method and apparatus for data interchange using tagged video bar codes for business-business transactions.

Another feature of the present invention is the provision of a method and apparatus for data interchange using tagged printed bar codes for business-business transactions.

Another feature of the present invention is the provision of a method and apparatus for data interchange using tagged video and/or tagged printed bar codes via a remote web, security, or phone camera and transmitted to a remote video display for data capture.

Another feature of the present invention is the use of tagged printed and/or tagged video bar codes to provide data in multiple languages.

Another feature of the present invention is the use of tagged printed and/or tagged video bar codes in conjunction with XML network routing equipment.

Another feature of the present invention is the provision of a method for data input into an electronic document using a keyboard.

Another feature of the present invention is the provision of a method for data input into an electronic document using voice recognition technology.

Another feature of the present invention is the provision of a method for data input into an electronic document using a computer-telephone interface. Another feature of the present invention is the provision of a method for data input into an electronic document using tagged 1-D bar code data.

Another feature of the present invention is the provision of a method for data input into an electronic document using tagged 2-D bar code data.

Another feature of the present invention is the provision of a method for data input into an electronic document using tagged 3D bumpy bar code data.

Another feature of the present invention is the provision of a method for data input into an electronic document using tagged OCR data.

Another feature of the present invention is the provision of a method for data input into an electronic document using tagged MICR data.

Another feature of the present invention is the provision of a method for data input into an electronic document using tagged RFID data.

Another feature of the present invention is the provision of a method for data input into an electronic document using tagged magnetic stripe data.

Another feature of the present invention is the provision of a method for data input into an electronic document using tagged ICR data.

Another feature of the present invention is the provision of a method for data input into an electronic document using un-tagged 1-D bar code data.

Another feature of the present invention is the provision of a method for data input into an electronic document using un-tagged 2-D bar code data.

Another feature of the present invention is the provision of a method for data input into an electronic document using un-tagged 3D bumpy bar code data.

Another feature of the present invention is the provision of a method for data input into an electronic document using un-tagged OCR data.

Another feature of the present invention is the provision of a method for data input into an electronic document using un-tagged MICR data.

Another feature of the present invention is the provision of a method for data input into an electronic document using un-tagged RFID data.

Another feature of the present invention is the provision of a method for data input into an electronic document using un-tagged magnetic stripe data.

Another feature of the present invention is the provision of a method for data input into an electronic document using un-tagged ICR data.

Another feature of the present invention is the provision of a method for data interchange between computers using different operating systems using tagged video bar codes in an e-mail.

Another feature of the present invention is the provision of a method for data interchange between computers using different operating systems using tagged video bar codes in an Instant Message.

Another feature of the present invention is the provision of a method for data interchange between computers using different operating systems using tagged video bar codes in a web-page.

Another feature of the present invention is the provision of a method for tagged data output into a cell phone device.

Another feature of the present invention is the provision of a method for tagged data output into a PDA device.

Another feature of the present invention is the provision of a method for tagged data output into a television set-top device.

Another feature of the present invention is the provision of a method for tagged data output into a communication network router device.

Another feature of the present invention is the provision of a method for tagged data output into a communication network switch device.

Another feature of the present invention is the provision of a method for tagged data output into a communication network hub device.

Another feature of the present invention is the provision of a method for tagged data output into an Automatic Teller Machine (ATM) device.

Another feature of the present invention is the provision of a method for tagged data output into a laptop computer device.

Another feature of the present invention is the provision of a method for tagged data output into a personal computer (PC) device.

Another feature of the present invention is the provision of a method for tagged data output into a pager device.

Another feature of the present invention is the provision of a method for tagged data output into a text messaging device.

Another feature of the present invention is the provision of a method for un-tagged data output into a cell phone device.

Another feature of the present invention is the provision of a method for un-tagged data output into a PDA device.

Another feature of the present invention is the provision of a method for un-tagged data output into a television set-top device.

Another feature of the present invention is the provision of a method for un-tagged data output into a communication network router device.

Another feature of the present invention is the provision of a method for un-tagged data output into a communication network switch device.

Another feature of the present invention is the provision of a method for un-tagged data output into a communication network hub device.

Another feature of the present invention is the provision of a method for un-tagged data output into an Automatic Teller Machine (ATM) device.

Another feature of the present invention is the provision of a method for un-tagged data output into a laptop computer device.

Another feature of the present invention is the provision of a method for un-tagged bar coded data output into a personal computer (PC) device.

Another feature of the present invention is the provision of a method for un-tagged data output into a pager device.

Another feature of the present invention is the provision of a method for un-tagged data output into a text messaging device.

Another feature of the present invention is the provision of an efficient method for bar coding UNICODE characters.

Another feature of the present invention is the provision of bar code representing tagged or un-tagged address information on a video display.

Another feature of the present invention is the use of tagged or un-tagged video or printed bar codes for discounts given to restaurants, grocery stores, convenience stores at the time of delivery of inventory in order to keep track of discounts and provide data to accounting and back-end systems.

Another feature of the present invention is using tagged or un-tagged video bar codes as pre-paid chits for things like bowling, go-kart rides, etc.

Another feature of the present invention is using cell phone cameras in conjunction with bar code decoder software to scan and decode tagged or un-tagged printed or video bar codes.

Another feature of the present invention is using web cameras in conjunction with bar code decoder software to scan and decode tagged or un-tagged printed or video bar codes.

Another feature of the present invention is the use of tagged or un-tagged video bar codes as cash or gift cards.

Another feature of the present invention is the use of tagged or un-tagged bar coded data on PDF documents in a print directory such as Yummy!.

Another feature of the present invention is the conversion of scanned bar coded data on a driver's license to XML data.

Another feature of the present invention is the use of tagged or un-tagged bar coded data in RSS feeds.

Another feature of the present invention is the use of a hash to produce the expiration date of product that carries a tagged or un-tagged bar code.

Another feature of the present invention is the use of XML tags in a tagged bar code to do mathematical calculations in a printed or video bar code.

Another feature of the present invention is the use of a hash in conjunction with a PIN to encrypt a tagged or un-tagged bar code.

Another feature of the present invention is the use of a hash in conjunction with a PIN to un-lock all or a portion of a tagged or un-tagged bar code.

Another feature of the present invention is the use of XML tags in a tagged bar code to represent row and cell identifiers in a spreadsheet software program.

Another feature of the present invention is the use of XML tags in a tagged bar code to represent attributes and tuples and specific records in a relational database.

Another feature of the present invention is the use of tagged or un-tagged bar coded data on employee financial transaction card statements and expense statements and vouchers for the purpose of reconciliation.

Another feature of the present invention is the use of tagged or un-tagged bar coded data in conjunction with EDI standards, such as ANSI.1, ASC X12, UN/EDIFACT, CICA, etc.

Another feature of the present invention is the association of a tagged or un-tagged bar code to an XML XSL or XSLT file.

Another feature of the present invention is the association of a tagged or un-tagged bar code to and XML XSD file Another feature of the present invention is the association of a tagged or un-tagged bar code to an XML Schema file.

Another feature of the present invention is the association of a tagged or un-tagged bar code to an XML DTD file.

Another feature of the present invention is the association of a tagged or un-tagged bar code to an XML file with XML Signatures.

Another feature of the present invention is the association of a tagged or un-tagged bar code to an XML pointer file.

Another feature of the present invention is the association of a tagged or un-tagged bar code to an XML XPath file.

Another feature of the present invention is the association of a tagged or un-tagged bar code to an XML file with XLinks.

Another feature of the present invention is the association of a tagged or un-tagged bar code to an e-Form created by the XForm standard.

Another feature of the present invention is the association of a tagged or un-tagged bar code to an XML document that uses XML:ID.

Another feature of the present invention is the present invention is a security feature in which tagged or un-tagged bar codes are graphically separated into two or more layers, and the graphical combination of all the layers is required in order to complete the graphical representation of the bar code for scanning.

Another feature of the present invention is the secure wireless transmission of tagged or un-tagged bar coded data by the optical scan.

Another feature of the present invention is the integration of the Airclic bar code solution to further extend the power of tagged or un-tagged bar coded e-Forms.

Another feature of the present invention is the integration of the NeoMedia cell phone camera bar code reader solution to extend the power of tagged or un-tagged bar coded e-Forms.

Another feature of the present invention is the enabling of coupons distributed by Booble.com.

Another feature of the present invention is the integration of the DataCard driver's license solution with the present invention.

Another feature of the present invention is the use of DataIntro software to create the bar coded e-Forms used in the present invention.

Another feature of the present invention is the use of PureEdge software to create the bar coded e-Forms used in the present invention.

Another feature of the present invention is the use of Icoya software to create the bar coded e-Forms used in the present invention.

Another feature of the present invention is the use of Adobe software to create the bar coded e-Forms used in the present invention.

Another feature of the present invention is the use of Microsoft software to create the bar coded e-Forms used in the present invention.

Another feature of the present invention is the use of Macola software to create the bar coded e-Forms used in the present invention.

Another feature of the present invention is the use of Altova MapForce software to manage and map bar coded e-Forms used in the present invention.

Another feature of the present invention is the use of tagged or un-tagged bar coded data in SmartBOL software products.

Another feature of the present invention is the use of tagged or un-tagged bar coded data in Macromedia frames in web pages, or windows.

Another feature of the present invention is the use of tagged or un-tagged bar coded data in QuickTime frames in web pages, or windows.

Another feature of the present invention is the use of tagged or un-tagged bar coded data in RealNetworks frames in web pages, or windows.

Another feature of the present invention is the use of tagged or un-tagged EPC bar codes.

Another feature of the present invention is the use of tagged or un-tagged Quick Response bar codes.

Another feature of the present invention is the use of tagged or un-tagged Semacodes.

Another feature of the present invention is the providing the self-tagging capability of e-Forms and related documents using 43 Things, Flickr, del.icio.us, etc.

Another feature of the present invention is HIPPA compliant tagged or un-tagged bar coded documents Another feature of the present invention is Sarbanes-Oxley compliant tagged or un-tagged bar coded documents.

Another feature of the present invention is encrypted data tags contained in the bar code.

Another feature of the present invention is the use of tagged or un-tagged bar codes to represent data in an e-Form as an integral part of the e-Form.

Another feature of the present invention is the use of tagged or un-tagged bar codes to represent data in an e-Form in a separate software application.

Another feature of the present invention is the use of e-Forms that are not constructed with HTML.

Another feature of the present invention is the use of e-Forms that are not constructed with XML.

Another feature of the present invention is the use of e-Forms that are not constructed as PDFs.

Another feature of the present invention is the use of the VISA XML standard for financial transaction card statement data interchange.

Another feature of the present invention is the use of AJAX programming.

Another feature of the present invention is the use of biometric data included within tagged or un-tagged 2D bar codes for validation, authentication, and verification activities.

Another feature of the present invention is the use of biometrics used in conjunction with tagged or un-tagged 2D bar codes for validation, authentication, and verification activities.

Another feature of the present invention is the use of MLC/MSC encoded bar codes.

Another feature of the present invention is the use of WiFi enabled cell phones as a device that can receive and transmit the present invention's form which may or may not contain tagged and/or un-tagged data summarized as a bar code.

Another feature of the present invention is the use of cell phone-PC merged devices.

Another feature of the present invention is the use of "Dial-A-Web Page" as a shortcut method to access web pages that may or may not include tagged and/or un-tagged data summed up as a bar code.

Another feature of the present invention is the use of "Dial-An-Exit" as a shortcut method to access information related to hotels, motels, restaurants, gas stations, etc. located at or near a specific exit on a highway. The information related to hotels, motels, restaurants, gas stations, ATM, etc. would be accessed by speaking or typing the Highway and Exit number into a cell phone, PDA, smart phone, etc., without having to depend on location based services acquiring a user's location, or may not provide enough granularity of position.

Another feature of the present invention is the use of "Dial-An-Airport" as a shortcut method to access information related to restaurants, bookstores, ATMs, rest rooms, etc. located at or near a specific gate or concourse in an airport.

The information related to restaurants, bookstores, ATMs, rest rooms, etc., would be accessed by first speaking or typing the airport code, and second speaking or typing the concourse, gate number, or flight number into a cell phone, PDA, smart phone, etc. without having to depend on location based services acquiring a user's location using WiFi, cell location, or GPS—which doesn't work indoors, or may not provide enough granularity of position. This feature of the present invention may be used with video bar codes that represent discounts, coupons, chits, tickets, bar coded e-money, etc., for vendors in or near the airport. These video bar coded discounts, coupons, chits, tickets, bar coded e-money may be delivered via SMS, EMS, MMS, e-mail, IM, etc.

Another feature of the present invention is the use of "Dial-An-Train Station" as a shortcut method to access information related to restaurants, bookstores, ATMs, rest rooms, etc., located at or near a specific track or concourse in a train station. The information related to restaurants, bookstores, ATMs, rest rooms, etc., would be accessed by first speaking or typing the train station name, or train station code, and second speaking or typing a concourse, track number, or train number into a cell phone, PDA, smart phone, etc. without having to depend on location based services acquiring a user's location using WiFi, cell location, or GPS—which doesn't work indoors, or may not provide enough granularity of position. This feature of the present invention may be used with video bar codes that represent discounts, coupons, chits, tickets, bar coded e-money, etc., for vendors in or near the train station. These video bar coded discounts, coupons, chits, tickets, bar coded e-money may be delivered via SMS, EMS, MMS, e-mail, IM, etc.

Another feature of the present invention is the use of "Dial-A-Stadium" as a shortcut method to access information related to restaurants, ATMs, rest rooms, etc. located at or near a specific seating section in an indoor or outdoor sporting venue. The information related to restaurants, ATMs, rest rooms, etc., would be accessed by first speaking or typing the stadium's name, or stadium's code, and second speaking or typing a seating section, or seat number into a cell phone, PDA, smart phone, etc. without having to depend on location based services acquiring a user's location using WiFi, cell location, or GPS—which doesn't work indoors or shielded environments, or may not provide enough granularity of position. This feature of the present invention may be used with video bar codes that represent discounts, coupons, chits, tickets, bar coded e-money, etc., for vendors in or near the stadium. These video bar coded discounts, coupons, chits, tickets, bar coded e-money may be delivered via SMS, EMS, MMS, e-mail, IM, etc.

Another feature of the present invention is the use of "Dial-A-Convention Center" as a shortcut method to access information related to restaurants, ATMs, rest rooms, etc., located at or near a specific area, exit, entrance, etc. in a convention hall, etc. The information related to restaurants, ATMs, rest rooms, etc. would be accessed by first speaking or typing the name of the convention center, or convention code, and second speaking or typing a specific area, exit, entrance, etc., into a cell phone, PDA, smart phone, etc. without having to depend on location based services acquiring a user's location using WiFi, cell location, or GPS—which doesn't work indoors. This feature of the present invention may be used with video bar codes that represent discounts, coupons, chits, tickets, bar coded e-money, etc., for vendors in or near the convention center. These video bar coded discounts, coupons, chits, tickets, bar coded e-money may be delivered via SMS, EMS, MMS, e-mail, IM, etc.

Another feature of the present invention is the use of GoXML as an XML schema.

Another feature of the present invention is the use of NavXML and GeoXML as schemas.

Another feature of the present invention is the use of Autonomy software that enable identification of the patterns that naturally occur in text, based on the usage and frequency of words or terms that correspond to specific concepts. In order to extract a document's digital essence (which may or may not include data summed up as a tagged or un-tagged bar code) in order to enable a host of operations to be performed automatically.

Another feature of the present invention is the inclusion of a bar code reader, RFID scanner, magnetic stripe reader in a sled, integrated into a cell phone, PCMCIA, SDIO, etc Another feature of the present invention is the use of iDRS intelligent recognition software application to process imaged files to extract data contained therein using ICR, OCR, MICR, and 1D and 2D bar code recognition technologies.

Another feature of the present invention is the use of microfilm and/or microfiche as either a source and/or target for the present inventions forms containing tagged and/or un-tagged data summarized as a bar code.

Another feature of the present invention is the provision of a software feature or ASP to provide a service for providing copyright filing of the present invention's forms containing tagged or un-tagged data summarized as a bar code.

Another feature of the present invention is the use of JSON Lightweight Data Interchange as an alternative to XML.

Another feature of the present invention is the use of JSON Lightweight Data Interchange in conjunction with XML.

Another feature of the present invention is the use of XML in the form of RSS Branded feeds.

Another feature of the present invention is the use of tagged and/or un-tagged bar codes in conjunction with documents created in the OpenDocument Format.

Another feature of the present invention is the use of tagged and/or un-tagged bar codes in conjunction with documents created in the XForms format.

Another feature of the present invention is the use of tagged and/or un-tagged bar codes in conjunction with documents created using Microsoft XPS.

Another feature of the present invention is the use of a Kofax departmental sized scanner with a built-in bar code scanner and decoder.

Another feature of the present invention is the use of bar codes displayed in web pages that use Adobe Flash.

The present invention may be built on top of Redberri software.

One or more of these and/or other features and advantages of the present invention will become apparent from the following specification and claims.

SUMMARY OF THE INVENTION

The present invention is directed towards means and methods for the interchange of data. This includes the interchange of data from one electronic system to another electronic system either directly or through an intermediary physical form such as a printed bar code, a video displayed bar code, an RFID tag, or other physical mechanism. The interchange of data is performed in a meaningful way so that it is readily usable. In particular, embedded tags can be used to facilitate the proper identification of the data.

According to one aspect of the invention, a 3-step method and apparatus provides for 1) inputting tagged or un-tagged data into electronic documents (e-forms), 2) summing up data in the electronic document as one or more 1D and/or 2D bar codes ready for interchange using data tags, and 3) outputting tagged data.

In the first step, tagged or un-tagged input data can come from a variety of data sources, including, but not limited to, 1D and/or 2D bar codes displayed on driver's licenses, national identification cards, social security cards, military identification cards, company identification cards, business cards, financial transaction cards including, but not limited to, credit cards, check cards, and ATM cards, health plan identification cards, purchase receipts, warranties, bills of lading, purchase orders, invoices, sales orders, insurance cards, statements of account, work orders, drawings, photographs, blueprints, packing lists, UCC forms, contracts, redemption coupons, newspapers, magazines, products, product packaging, vehicles, shipping containers, pallets, etc. In addition, tagged or un-tagged sources for data input into an electronic document can come from sources, such as, but not limited to, 3D bumpy bar codes, RFID tags, magnetic stripes, optically recognizable characters (OCR), characters recognizable via magnetic ink technology (MICR), intelligently recognized characters (ICR), voice, voice recognition technology, computer-telephone interfaces, keyboards, touch screens, PC, laptop, PDA, mouse, pager, text messaging device, WiFi enabled cell phones, cell phone-PC merged devices, etc.

Electronic document file types have previously been created using a very limited number of file formats, specifically, HTML and XML in order to make them universally available for viewing in a browser, and as PDFs using the Adobe Reader plug-in. In a quantum leap forward the present invention makes virtually any electronic document file format available for viewing and as a mechanism to sum-up data for exchange as one or more tagged or un-tagged bar codes. As an example, additional electronic document file types that would be made available in the present invention using a viewer, such as, but not limited to the Kamel Fastlook browser plug-in include, but are not limited to the following:

300 - Enable WP 3.0
BAK - AutoCAD backup files
BMP - Windows bitmap
CAL - SuperCalc 5
CDR - Corel Draw (Header only)
CGM - Computer Graphic Metafiles
CH3 - Harvard Graphics 3.0
CHP - Legacy files
CHT - Harvard Graphics 2.0
CUR - Windows Cursor
DB - Paradox Database
DB - Smart Database
DBA - DataEase 4.x
DBF - DBase III, IV, V
DCX - Multipage PCX
DGN - Intergraph/MicroStation files*
DIB - Windows bitmap
DIF - Navy DIF
DLL - Windows DLL file
DOC - First Choice 3 WP
DOC - IBM DisplayWrite 4/5
DOC - Microsoft Word 4.0-6.0
DOC - Microsoft WordPad
DOC - MultiMate 3.6
DOC - SmartWare II
DOC - Wang IWP files
DOC - Word for Windows 1.0, 7.0, 97
DOX - MultiMate 4.0
DRW - Micrografx Draw
DTF - Q&A Database
DWF - AutoCAD DWF 2.0

-continued

DWG - AutoCAD Drawing files
DX3 - DEC DX files
DXF - Drawing Interchange files
EPS - EPS (TIFF header)
EXE - DOS/Windows Executable
EXE - Self Extracting ZIP
FAX - CCITT Group3 Fax
FAX - CCITT Group3/4 Fax
FFT - IBM FFT files
First Choice Word Processor
FNT - MultiMate Advantage 2
FNX - MultiMate Note
FOL - First Choice DB
FWK - Framework III
GEM - GEM Image
Generic WKS
GIF - Rendered Image files
GP4 - CALS Group4 images
HPGL/2 - Hewlet-Packard Graphics Language
HTML - Internet-WWW
IBM Writing Assistant
ICO - Windows Icon
IDW - Autodesk Inventor
IMG - GEM Image file
JFIF
JPEG - Compressed Color
JW - JustWrite 1.0/2.0
Lotus Manuscript 1.0-2.0
Lotus PIC
LTR - PC File 5.0 Doc
LZA Compress
LZH Compress
Mac WordPerfect 2.0
Mac WordPerfect 3.0
Mac WordPerfect 1.x
Mac Works 2.0 Database
Mac Works 2.0 Spreadsheet
Mac Works 2.0 Word Processor
Macintosh PICT/PICT2
MacPaint
MacWrite II
MASS 11
MDB - Microsoft Access
MI - ME10/30
Microsoft Office Binder
Multiplan 4
Novell PerfectWorks 2.0 Word Processor
Novell PerfectWorks 2.0 Draw
Novell PerfectWorks 2.0 Spreadsheet
Novell Presentations 3.0
OS/2 Bitmap
OS/2 Warp Bitmap
PCX - Zsoft Corporation files
PFB - PFS Write
PL - PFS: Plan
PPT - PowerPoint 3.0-4.0PPT-Powerpoint 7.0
PR2 - Freelance files
Professional Write 1-2
PRT - CADKey design file
PWP - Professional Write Plus
Q&A Write
Q&A Write 3
R2D - Reflex files
RBF - R:Base SystemV/5000
RFT - IBM DCA/RFT files
RLC - CAD Overlay files
RLE - Windows bitmap
RTF - Rich Text Format
SAM - Ami Pro files
SAM - Samna files
SDW - Ami Draw
Signature
SLDDRW - SolidWorks
SNP - Lotus Snapshot
SPR - Sprint files
SS - First Choice Spreadsheet
SSF - Enable Spreadsheet
SY1 - Smart PIC files
SYM - Lotus Symphony
TAR - UNIX Tar files -continued TAZ - UNIX Compress files
TGA - Rendered Image files
TIF - TIFF Group3/4, LZW Color
TW - Total Word files
TXT - IBM DisplayWrite 2/3
TXT - Text Files
VW4 - Volkswriter files
WB1 - Quattro Pro for Windows
WDB - MS Works Database
WG1 - Lotus 123 for OS2
Windows Works Database
Windows Works Spreadsheet
WK1 - Lotus 123 v1.0-2.0
WK3 - Lotus 123 v3.0-5.0
WKS - MS Works Spreadsheet
WKS - VP-Planner
WKU - Mosaic Twin files
WMC - WordMarc files
WMF - Windows Metafiles
Word for Macintosh 4.0-5.0
WP - WordPerfect 4.2
WP - OfficeWriter
WPD - WordPerfect 5.x
WPD - WordPerfect 6.0-7.0
WPF - Enable WP 4.x
WPG - WordPerfect Graphic 1.0-2.0
WPG - WordPerfect Presentations
WPS - MS Works Wordprocessor
WQ1 - Quattro Pro DOS
WRI - Windows Write
WS - WordStar 3.0-7.0
WS - Smart Spreadsheet
WS - Wordstar for Windows
WS2 - WordStar 2000
XLC - Microsoft Excel Chart
XLS - Microsoft Excel
XyWrite/Nota Bene
ZIP - PkZip file Also, by using other viewers in the present invention, such as, but not limited to, DjVu, DiJu files that include data summed up as one or more tagged and/or un-tagged bar codes can be read.

In addition, by using other viewers in the present invention, such as, but not limited to, PureEdge Viewer, PureEdge files that include data summed up as one or more tagged and/or un-tagged bar codes can be read.

Tagged input data is automatically input into an electronic document. Input data tags may be useful to facilitate data input to an electronic document, and subsequently re-tagged by the electronic document in order to facilitate interchange into an information system. Alternatively, input data tags may be useful to facilitate data input into an electronic document, and subsequently remain with the input data without alteration in order to facilitate interchange into an information system.

Un-tagged input data is semi-automatically input into an electronic document.

In step two, source data and/or electronic form fields contained in the electronic document are summed up as one or more 1D and/or 2D tagged bar code(s), which is the means for data interchange via bar code scanning technology in the present invention. Alternatively, the data may be summed up by the remote server and returned to the original electronic document, or other electronic documents as one or more 1D and/or 2D tagged bar codes for data interchange via bar code scanning technology. The electronic document may use the data tags contained in the source data, and/or strip the source data tags and/or re-tag the source data in order to facilitate data interchange. Additionally, the electronic document can add data tags to un-tagged input source data in order to facilitate interchange into an information system.

In step three, tagged information summed up on an electronic document in the form of one or more 1D and/or 2D bar codes are captured from either a printed version of the electronic document, or a video displayed version of the electronic document. The video bar code may come from either a local, or remotely viewed source. The captured tagged data string is parsed; the data tags are used to route and/or input and/or exchange data into a variety of software applications, such as but not limited to, a database, a spreadsheet, a web page, a word processor, another electronic document, etc. The tags may remain with the output data, or alternatively may be stripped from the data.

The tagged data captured from one or more 1D and/or 2D bar code(s) in an electronic document, either directly off a video display or from a printed version of the document, can be output to a data target that is capable of receiving and/or use tagged data, such as but not limited to, an RFID tag, Smart Card, magnetic stripe, bar code printer, OCR encoder, MICR encoder, ICR encoder, cell phone, television set-top box, telecommunication network router, telecommunication network switch, telecommunication network hub, ATM machine, laptop computer, PC, PDA, pager, text messaging device, touch screen, keyboard, mouse, etc.

In a preferred embodiment, a business user or consumer uses an integrated software system to create electronic generated documents which include integrally or in a separate software application tagged bar coded information, create specific style sheets to define bar coded data tags, publish documents with tagged bar coded information, scan video displayed documents using a high scan rate CCD or linear imager, or scan printed documents using any type of applicable bar code reader to capture tagged bar coded information, cache tagged bar coded information, parse the tagged bar coded information and applicable software applications, strip the bar coded data tags, input stripped bar coded data into the applicable software application.

This scanned information is not formatted specifically for any business/consumer software and therefore is easily transferable between businesses/consumers which may use different software applications to manipulate the same data to suit their needs. This minimizes the need for many of the conversion programs or interpretation programs, commonly known as middleware, and provides data interchange across a wide variety of settings for a myriad of purposes.

According to another aspect of the present invention, a method for data interchange is provided. The method includes providing a first document having at least one data field. Then inputted information is received into the at least one data field. A bar code is generated based on the at least one data field and the information inputted into the at least one data field. The at least one data field and the information inputted into the at least one data field is stored within the first document or otherwise.

According to another aspect of the present invention, a method for data interchange includes opening a document having tagged bar coded information including data tags and data. Then the data is updated. A bar code defined by the tagged bar code information is also updated. The tagged bar coded information is then transmitted. The transmitting can occur in electronic or paper form.

According to another aspect of the present invention, a method for data interchange includes opening a document having embedded tagged or un-tagged bar coded information, updating data within data field of the document, updating the embedded bar coded information based on the data, and generating a bar code based on the embedded bar coded information. The embedded bar coded information can then be transmitted in either electronic or paper form, or a combination of electronic and paper forms.

According to another aspect of the present invention, a method for data interchange includes opening a document that is linked to tagged or un-tagged bar coded information represented in a separate software application, updating data within the data field of the document, updating the bar coded information in the linked and separate software application based on the data, and generating a bar code based on the bar coded information in the linked and separate software application. The combination of the document and bar coded information in a linked and separate software application can then be transmitted in either electronic or paper form, or combination of electronic and paper forms.

According to another aspect of the present invention, a method for data interchange includes summing up data associated with an electronic document to provide summed up data, representing the summed up data as one or more bar codes, and returning the one or more bar codes for display and data capture via a bar code scan from either a video display or a printed version of the one or more bar codes. The summing up may include taking data from multiple information fields to create the summed up data. The data may include data tags. The method may include adding data tags to the data to assist in data interchange. The steps of summing up, representing, and returning are performed by a software application running on a first computer. The method may include sending the data associated with the electronic document to a remote computing device for performing the steps of summing up, representing, and returning. The step of returning may be returning an image. The electronic document may include data from a source associated with the electronic document. The data source may be a physical device. The one or more bar codes may be maintained by incorporating the one or more bar codes into the electronic document as one or more images. The method may include representing the electronic document and the one or more bar codes on microfilm or microfiche for archival purposes.

According to another aspect of the present invention, a method for data interchange includes receiving a number from a user representing a location of a web resource, accessing the web resource using the number, receiving from the web resource a bar code summing up data associated with the web resource. The number may be a phone number or other number which may be easily entered by a user, such as using a dial pact of a phone. The number may include other characters associated with a dial pad of a phone. The data may data tags.

A more complete understanding of the method and apparatus for tagged bar code data interchange will be afforded to those skilled in the art, as well as a realization of the additional features and advantages thereof, by a consideration of the following detailed description of the preferred embodiment. Reference will be made to the appended drawings which will first be described briefly.

BRIEF DESCRIPTION OF THE DRAWINGS

FIG. 3 is a pictorial representation of a style sheet used by the "sending company" to identify the fields and tags for the bar codes shown in FIG. 2.

FIG. 4 is a pictorial representation of a style sheet used by the "receiving company" to identify the fields and tags to receive the bar codes shown in FIG. 2.

FIG. 7 is a pictorial representation of the "receiving company's" software application which receives data from the data cache depicted in FIG. 6.

FIG. 8 is an example of data and data tags contained in a two-dimensional bar code.

DETAILED DESCRIPTION OF THE INVENTION

Figure 1:
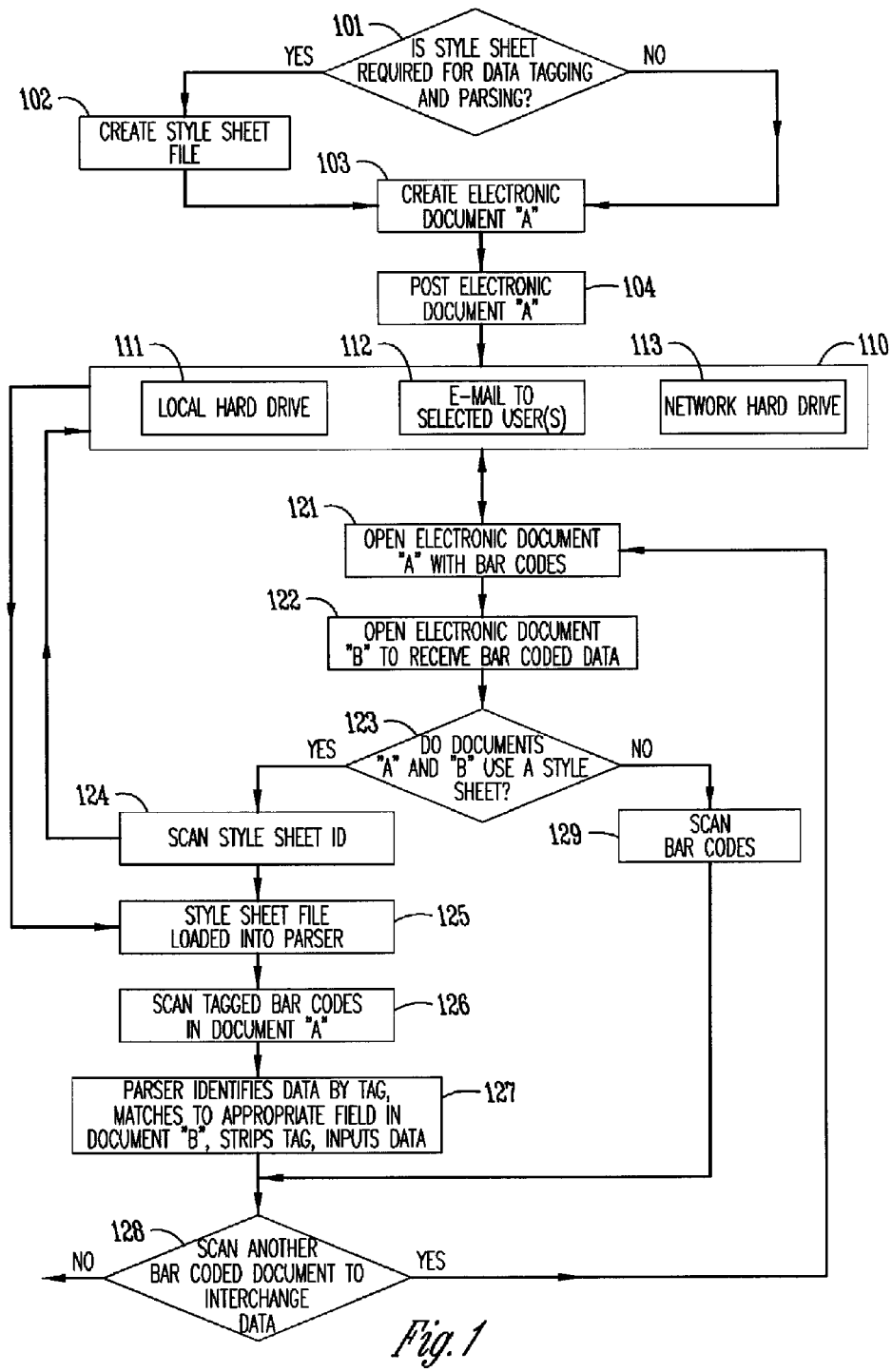
FIG. 1 is a flowchart representation of the preferred method of the present invention.

One aspect of the present invention includes a 3-step method and apparatus for 1) inputting tagged or un-tagged data into electronic documents (e-forms), 2) summing up data in the electronic document as one or more 1D and/or 2D bar codes ready for interchange using data tags, and 3) outputting tagged data.

In the first step of the present invention, tagged or un-tagged input data can come from a variety of data sources, including, but not limited to, 1D and/or 2D bar codes displayed on driver's licenses, national identification cards, social security cards, military identification cards, company identification cards, business cards, financial transaction cards including, but not limited to, credit cards, check cards, and ATM cards, health plan identification cards, purchase receipts, warranties, bills of lading, purchase orders, invoices, sales orders, insurance cards, statements of account, work orders, drawings, photographs, blueprints, packing lists, UCC forms, contracts, redemption coupons, newspapers, magazines, products, product packaging, vehicles, shipping containers, pallets, etc. In addition, tagged or un-tagged sources for data input into an electronic document can come from various sources, such as, but not limited to, 3D bumpy bar codes, RFID tags, magnetic stripes, optically recognizable characters (OCR), characters recognizable via magnetic ink technology (MICR), intelligently recognized characters (ICR), voice, voice recognition technology, computer-telephone interfaces, keyboards, touch screens, PC, laptop, PDA, mouse, pager, text messaging device, etc.

Electronic document file types for viewing, sharing, and exchanging data on the Internet have previously been created using a very limited number of file formats, specifically, HTML and XML in order to make them universally available for viewing in a browser, and as PDFs using the Adobe Reader plug-in. In a quantum leap forward the present invention makes virtually any electronic document file format available for viewing and as a mechanism to sum-up data for exchange as one or more tagged or un-tagged bar codes. As an example, additional electronic document file types that would be made available in the present invention using a viewer, such as, but not limited to the Kamel Fastlook browser plug-in include, but are not limited to the following:

300 - Enable WP 3.0
BAK - AutoCAD backup files
BMP - Windows bitmap
CAL - SuperCalc 5

-continued

CDR - Corel Draw (Header only)
CGM - Computer Graphic Metafiles
CH3 - Harvard Graphics 3.0
CHP - Legacy files
CHT - Harvard Graphics 2.0
CUR - Windows Cursor
DB - Paradox Database
DB - Smart Database
DBA - DataEase 4.x
DBF - DBase III, IV, V
DCX - Multipage PCX
DGN - Intergraph/MicroStation files*
DIB - Windows bitmap
DIF - Navy DIF
DLL - Windows DLL file
DOC - First Choice 3 WP
DOC - IBM DisplayWrite 4/5
DOC - Microsoft Word 4.0-6.0
DOC - Microsoft WordPad
DOC - MultiMate 3.6
DOC - SmartWare II
DOC - Wang IWP files
DOC - Word for Windows 1.0, 7.0, 97
DOX - MultiMate 4.0
DRW - Micrografx Draw
DTF - Q&A Database
DWF - AutoCAD DWF 2.0
DWG - AutoCAD Drawing files
DX3 - DEC DX files
DXF - Drawing Interchange files
EPS - EPS (TIFF header)
EXE - DOS/Windows Executable
EXE - Self Extracting ZIP
FAX - CCITT Group3 Fax
FAX - CCITT Group3/4 Fax
FFT - IBM FFT files
First Choice Word Processor
FNT - MultiMate Advantage 2
FNX - MultiMate Note
FOL - First Choice DB
FWK - Framework III
GEM - GEM Image
Generic WKS
GIF - Rendered Image files
GP4 - CALS Group4 images
HPGL/2 - Hewlet-Packard Graphics Language
HTML - Internet-WWW
IBM Writing Assistant
ICO - Windows Icon
IDW - Autodesk Inventor
IMG - GEM Image file
JFIF
JPEG - Compressed Color
JW - JustWrite 1.0/2.0
Lotus Manuscript 1.0-2.0
Lotus PIC
LTR - PC File 5.0 Doc
LZA Compress
LZH Compress
Mac WordPerfect 2.0
Mac WordPerfect 3.0
Mac WordPerfect 1.x
Mac Works 2.0 Database
Mac Works 2.0 Spreadsheet
Mac Works 2.0 Word Processor
Macintosh PICT/PICT2
MacPaint
MacWrite II
MASS 11
MDB - Microsoft Access
MI - ME10/30
Microsoft Office Binder
Multiplan 4
Novell PerfectWorks 2.0 Word Processor
Novell PerfectWorks 2.0 Draw
Novell PerfectWorks 2.0 Spreadsheet
Novell Presentations 3.0
OS/2 Bitmap
OS/2 Warp Bitmap
PCX - Zsoft Corporation files -continued PFB - PFS Write
PL - PFS: Plan
PPT - PowerPoint 3.0-4.0PPT-Powerpoint 7.0
PR2 - Freelance files
Professional Write 1-2
PRT - CADKey design file
PWP - Professional Write Plus
Q&A Write
Q&A Write 3
R2D - Reflex files
RBF - R:Base SystemV/5000
RFT - IBM DCA/RFT files
RLC - CAD Overlay files
RLE - Windows bitmap
RTF - Rich Text Format
SAM - Ami Pro files
SAM - Samna files
SDW - Ami Draw
Signature
SLDDRW - SolidWorks
SNP - Lotus Snapshot
SPR - Sprint files
SS - First Choice Spreadsheet
SSF - Enable Spreadsheet
SY1 - Smart PIC files
SYM - Lotus Symphony
TAR - UNIX Tar files
TAZ - UNIX Compress files
TGA - Rendered Image files
TIF - TIFF Group3/4, LZW Color
TW - Total Word files
TXT - IBM DisplayWrite 2/3
TXT - Text Files
VW4 - Volkswriter files
WB1 - Quattro Pro for Windows
WDB - MS Works Database
WG1 - Lotus 123 for OS2
Windows Works Database
Windows Works Spreadsheet
WK1 - Lotus 123 v1.0-2.0
WK3 - Lotus 123 v3.0-5.0
WKS - MS Works Spreadsheet
WKS - VP-Planner
WKU - Mosaic Twin files
WMC - WordMarc files
WMF - Windows Metafiles
Word for Macintosh 4.0-5.0
WP - WordPerfect 4.2
WP - OfficeWriter
WPD - WordPerfect 5.x
WPD - WordPerfect 6.0-7.0
WPF - Enable WP 4.x
WPG - WordPerfect Graphic 1.0-2.0
WPG - WordPerfect Presentations
WPS - MS Works Wordprocessor
WQ1 - Quattro Pro DOS
WRI - Windows Write
WS - WordStar 3.0-7.0
WS - Smart Spreadsheet
WS - Wordstar for Windows
WS2 - WordStar 2000
XLC - Microsoft Excel Chart
XLS - Microsoft Excel
XyWrite/Nota Bene
ZIP - PkZip file Also, by using other viewers in the present invention, such as, but not limited to, DjVu, DiJu files that include data summed up as one or more tagged and/or un-tagged bar codes can be read).

In addition, by using other viewers in the present invention, such as, but not limited to, PureEdge Viewer, PureEdge files that include data summed up as one or more tagged and/or un-tagged bar codes can be read.

Tagged input data is automatically input into an electronic document. Input data tags may be useful to facilitate data input to an electronic document, and subsequently re-tagged by the electronic document in order to facilitate interchange into an information system. Alternatively, input data tags may be useful to facilitate data input into an electronic document, and subsequently remain with the input data without alteration in order to facilitate interchange into an information system. Un-tagged input data is semi-automatically input into an electronic document.

In step two, source data and/or electronic form fields contained in the electronic document are summed up as one or more 1D and/or 2D tagged bar code(s), which is the means for data interchange via bar code scanning technology in the present invention. Alternatively, the data may be summed up by the remote server and returned to the original electronic document or other electronic documents as one or more 1D and/or 2D tagged bar codes for data interchange via bar code scanning technology. The electronic document may use the data tags contained in the source data, and/or strip the source data tags and/or re-tag the source data in order to facilitate data interchange. Additionally, the electronic document can add data tags to un-tagged input source data in order to facilitate interchange into an information system.

In step three, tagged information summed up on an electronic document in the form of one or more 1D and/or 2D bar codes can be captured from either a printed version of the electronic document, or a video displayed version of the electronic document. The video bar code may come from either a local, or remotely viewed source. The captured tagged data string is parsed; the data tags are used to route and/or input and/or exchange data into a variety of software applications, such as but not limited to, a database, a spreadsheet, a web page, a word processor, another electronic document, etc. The tags may remain with the output data, or alternatively may be stripped from the data.

A preferred embodiment of the present invention describes a scenario in which the electronic document has the intelligence necessary to sum up, and tag data for interchange. In the following example, data designated for interchange is summed up by software, firmware, or hardware and not the electronic document itself.

The tagged data in the following example may be sent to a remote compute device such as, but not limited to a server running a software application that sums up the data, tags it for interchange as one or more 1D and/or 2D bar codes, and returns it to the originating electronic document for display and data capture via a bar code scan from either a video display or printed as a hard-copy. Alternatively, the tagged data in the form of one or more 1D and/or 2D bar codes, may be returned to another software window open on the same computing device where the originating electronic document is resident, or may be returned to a different hardware device for display and data capture via a bar code scan from a video display or printed as a hard-copy.

As an example, a purchasing agent would use an Internet browser, such as but not limited to, Internet Explorer, Firefox, Opera, etc. to perform an Internet search for a product using an Internet search engine such as, but not limited to, Google, Yahoo!, MSN, Acoona, Lycos, Alta Vista, Teoma, Excite, Northern Light, NBC i/Snap, Go/Infoseek, Overture, Kanoodle, InfoSpace, Switchboard, WhoWhere?, Orbitz, etc. The purchasing agent would go to a relevant web-page, and use a button on their Internet browser to request tagged data in the form of one or more 1D and/or 2D bar codes be returned to them. The Internet search engine, or an Application Service Provider (ASP), would process the request to sum up relevant demographic data, product data, etc., in the form of one or more 1D and/or 2D tagged data bar codes ready for data interchange into the purchasing agent's business system software as a purchase order, purchase order request, etc.

Alternatively, the purchasing agent could use their Internet browser to contact Thomas Register to perform an Internet search for a product using their search engine. The purchasing agent would go to a relevant web-page, use a button on the Thomas Register web-page to request tagged data in the form of one of more 1D and/or 2D bar codes be returned to them. Thomas Register would process the request to sum up relevant demographic data, product data, etc. in the form of one or more 1D and/or 2D tagged data bar codes that would be used to facilitate data interchange into the purchasing agent's business system software as a purchase order, purchase order request, etc.

In these examples, XML is very powerful when industry-specific XML standards are used. The following chart details some industry-specific or application-specific XML standards that are designed to facilitate data interchange. Industry-specific XML standards can be applied in the present invention as tags for input data, tags for data summed up in the form of one or more 1D and/or 2D bar codes, or tags for output data.

| INDUSTRY | STANDARDS AND RELATED ITEMS | DESCRIPTION |
| --- | --- | --- |
| Financial Services | RIXML, finXML, FIXML, FpML, OFX, MISMO, GLXML, VISA XML | Used to facilitate electronic data exchange in specific financial segments, such Capital Markets, Mortgage, and Securities. |
| Insurance | ACCORD | Suite of XML specifications designed to facilitate the electronic exchange of Life and Annuity, Property and Casualty, and Reinsurance information |
| Criminal Justice/Legal | Legal Justice XML, LegalXML | Specifications for electronic court filing, court documents, legal citations, transcripts, criminal justice intelligence systems, and others |
| Banking | BIPS, IFX | Used by the banking industry to exploit electronic delivery channels to rapidly deliver applications and products to consumers |
| Business Reporting | XBRL | Enables dynamic and interactive publishing, exchange, and analysis of complex financial information in corporate business reports |

-continued

| INDUSTRY | STANDARDS AND RELATED ITEMS | DESCRIPTION |
|---|---|---|
| EDI | X12, XML/EDI, tranXML | Used to facilitate inter-industry electronic interchange of business transactions |
| Human Resources | HR-XML | Suite of XML specifications designed to enable e-business and the automation of human resources-related data exchanges |
| Customer Information | CPExchange, xNAL, xCIL, xCRL | Used to represent customer information in a standard way to achieve interoperability between different systems, processes, and platforms |
| Aerospace/Defense | eAIP | Used for the publication and exchange of the Aeronautical Information Publication in electronic format |
| Automotive | SAE J2008 | Designed to provide easy access to emission-related automotive service information |
| E-commerce | BPML, ebXML, cXML, xCBL, BRML, IOTP | Used to facilitate Internet commerce |
| ERP | OAGIS | Used to provide a common horizontal message architecture |
| Manufacturing | MDSI-XML | Facilitate electronic exchange of manufacturing data |
| Telecommunications | MAXML, WAP-WML | Used in development of telecommunications applications |
| Transportation | tranXML, MTML, tXML | Used in development of telecommunications applications |
| News | RSS | Used in news feeds, and can be used to feed pertinent data and news inside an organization |
| Building and Construction | bcXML | Used in the building and construction industry to facilitate exchange of information |
| Other | NavXML, GXML | Geographic based XML |
| Internet Search XML | Go XML | Internet Search XML |

The information encoded in printed bar codes can be captured using a variety of scanning equipment that can configured as either hand-held devices or bulk scanning equipment. Printed bar code readers can be Charge Coupled Device (CCD) scanners with short or long depths of field. CCD Scanners with longer "laser-like" depths of field are called Imagers. CCD Scanners have no moving parts and use an LED array with hundreds or thousands of CCD light detectors to measure the ambient light from an illuminated bar code image. CCD Scanners capture the entire bar code image and form a signal pattern that can be decoded. The decoder may be integrated into the scanner, or operate on a separate device.

Also, CCD camera and decoder combinations can be used to scan and decode video or printed bar codes. Scanbuy and NeoMedia provide bar code decoder technology that enables CCD cameras in cell phones or web cams to serve as bar code readers.

The information encoded in printed bar codes can also be captured using Laser Scanners. Laser Scanners have a very precise beam of light which can be reflected accurately in a range of several inches to several feet to dozens of feet. Laser Scanners capture data encoded in a bar code by measuring reflected light of a specific frequency originating from the scanner itself. Typically, Laser Scanners have a moving beam which sweeps back and forth; some older Laser Scanners required the user to move the beam across the bar code.

Printed bar codes can also be read with a Pen Wand, which is the simplest bar code reader. It contains no moving parts and is a durable and low cost. However, a Pen Wand can present a challenge to the user, because it has to remain in direct contact with the bar code, must be held at a certain angle, and has to be moved over the bar code at a certain speed.

A printed bar code can also be read with a Slot Scanner, which remains stationary and the item with the bar code on it is pulled by hand through the slot. Slot Scanners are typically used to scan bar codes on identification cards.

A printed bar code can also be read with a Camera Reader that uses a small video camera to capture an image of a bar code. The reader uses a sophisticated digital image processing technique to decode the bar code. Camera Readers use the same CCD technology as in a CCD bar code reader except that instead of having a single row of sensors, a video camera has hundreds of rows of sensors arranged in a two dimensional array so they can generate an image of a bar code suitable for decoding.

Video displayed bar codes can only be captured successfully for decoding using CCD Scanners, Imagers, or Camera Readers.

Any type of bar code scanner can be connected to a device such as a computer, or cash register, etc. via a hard-wire or RF connection.

The tagged data captured from one or more 1D and/or 2D bar code(s) in an electronic document, either directly off a video display or from a printed version of the document, can be output to a data target that is capable of receiving and/or use tagged data, such as but not limited to, an RFID tag, Smart Card, magnetic stripe, bar code printer, OCR encoder, MICR encoder, ICR encoder, cell phone, television set-top box, telecommunication network router, telecommunication network switch, telecommunication network hub, ATM machine, laptop computer, PC, PDA, pager, text messaging device, touch screen, keyboard, mouse, etc.

Figure 10:
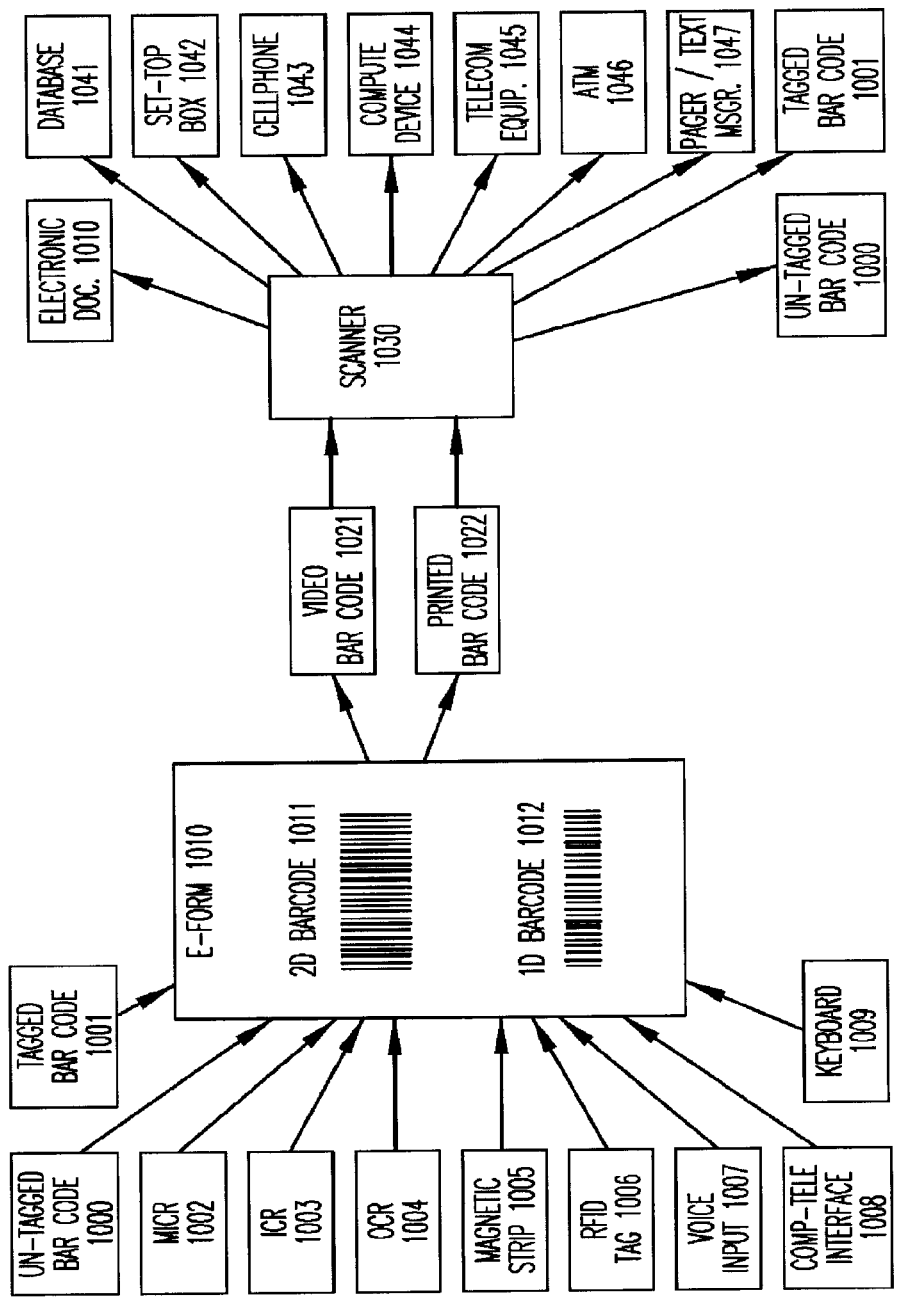
FIG. 10 is a general block diagram of the present invention.

FIG. 10 is a general block diagram of one embodiment of the present invention. E-form 1010 is capable of receiving input from a variety of tagged or un-tagged data sources, including but not limited to, an un-tagged bar code 1000, bar code 1000 can be a 1 Dimension (1D), 2 Dimension (2D), or 3D bar code bumpy bar code.

Alternatively, E-form 1010 is capable of receiving input form tagged bar codes 1001, bar code 1001 can be a 1D, 2D, or 3D bar code. These tagged or un-tagged 1D or 2D input bar codes can be displayed as printed and/or local or remote video bar codes.

Also, E-form 1010 can receive input from tagged or un-tagged data contained in the form of MICR 1012, ICR 1003, OCR 1004, or contained in magnetic stripes 1005 or RFID tags 1006.

Also, E-form 1010 is capable of receiving tagged or un-tagged data from sources such as, but not limited to, voice input 1007, computer-telephone interfaces 1008, keyboards 1009, etc.

E-Form 1010 sums up information ready for interchange as one or more tagged 1D bar codes 1012 and/or tagged 2D bar codes 1011. The data contained in the 1D 1012 and/or 2D bar codes 1011 is tagged to facilitate data interchange with various data targets.

E-form 1010 can be displayed as a video document 1021 and/or as a printed document 1022 in order for the tagged data summed up as one or more tagged 1D bar codes 1012 and/or tagged 2D bar codes 1011 to be captured by bar code scanner 1030. Video document 1021 can be a local document or remote viewed document, Bar code scanner 1030 is capable of outputting tagged and/or un-tagged data captured represented as 1D bar codes 1012 and/or 2D bar codes 1011 to software applications such as, but not limited to, other E-forms 1010', a database 1041, etc. Also, the data being output by scanner 1030 captured from E-form 1010 represented in either a video document 1021 and/or printed document 1022 may be output to devices such as, but not limited to, a set-top box 1042, cell phone 1043, compute device 1044 such as, but not limited to a PC, laptop, server, micro-processor, PDA, etc., telecom equipment 1045 such as but not limited to a router, hub, switch, etc., Automatic Teller Machine (ATM) 1046, or a pager or text messenger 1046, etc. Bar code scanner 1030 is also capable of outputting un-tagged bar codes 1000 and/or tagged bar codes 1001. Un-tagged bar codes 1000 and tagged bar codes 1001 may be 1D, and/or 2D, and or 3D.

Bar Codes

In the present invention, bar codes are used for summing up data which is tagged to facilitate data interchange. The bar codes used the present invention to facilitate data interchange can be displayed in a printed and/or video format. Additionally bar codes can serve as sources of data for input into an electronic document, and can also be the form of target data output by the present invention Printed Bar Codes Printed bar codes are well known in the art, and are a proven, efficient means for data collection. A bar code is a coded image of bars and spaces, which can be used to represent numbers and other symbols. A printed bar code can be 1 Dimension (1D), or 2 Dimension (2D). Common standardized 1D bar code formats include, but are not limited to, Code 39, Code 128, and Interleaved 2 of 5. A common standardized 2D bar code format includes, but is not limited to, PDF 417. There are also various proprietary 1D and 2D bar code formats. A bar code reader is used to read the code, and translates the image of the bar code into digital data.

Following is a more complete list of various 1D and 2D printed bar codes used in the world today. This list includes, but is not limited to, Code 39, Code 39 extended, Danish PTT 39 Bar code, French Postal 39 A/R, German Postal Bar code Identcode 11, German Postal Bar code Leitcode 13, 2 of 5 Interleaved, 2 of 5 Industrial, 2 of 5 Matrix Plessey, Codabar, MSI Plessey, MSI Plessey+CHK10, MSI Plessey+CHK10+ CHK10, MSI Plessey+CHK11+CHK10, 2 of 5 IATA, 2 of 5 Datalogic, Code 39 Reduced, USPS tray label, USPS sack label, Code32, Codabar Rationalised, MSI Plessey+CHK11, OMR, Code 93, Code 93 extended, 128 A, 128 B, 128 C, UCC-128, EAN/JAN-8, EAN/JAN-8 +2, EAN/JAN-8 +5, EAN/JAN-13, EAN/JAN-13 +2, EAN/JAN-13 +5, UPC-A, UPC-A +2, UPC-A +5, UPC-E, UPC-E+2, UPC-E+5, Oce UNICODE, 128 utoswitch, EAN 128, ISBN, ISSN, Swiss Postal, Code11, UPS Standard (18 digits), UPS 18 digits, UPS Standard (11 digits), UPS 11 digits, 128 X (Free Type), Telepen, PDF-417, PDF-417 (HP Mode), MicroPDF417, Royal Mail 4-State Customer Code, Dutch 4-State Postal, Singapore Post 4-State Postal Code, Australia Post 4-State Postal Code, Japan Post 4-State Postal Code, Australia Post 4-State Postal Code 37,52,67, Australia 4-state postal 37-GUST (HP Mode), Australia 4-state postal 52-FF-MET (HP Mode), Australia 4-state postal 67-FF-MET (HP Mode), Australia 4-state postal FCC-45 REPLY (HP Mode), Singapore Post 4-State Postal Code (HP Mode), DataMatrix, MaxiCode, MaxiCode (HP Mode), USPS FIM, POSTNET 5 ZIP+4, POSTNET 9 ZIP+4, POSTNET 11 DPC, PLANET, Aztec, Aztec Mesas, QR Code, Code 49, Channel Code, Code One, SuperCode, RSS, EAN/UCC Composite Symbology, Codablock F, Dot Code A, Code16K.

Bar Code Security Features (Printed Bar Codes)

For certain applications it may be a requirement to add a level of security in order to prevent the reading and/or scanning of sensitive or proprietary information that may be contained in a tagged bar code in an electronic document.

One method of providing an additional layer of security against someone attempting to read the human readable portion that often accompanies a tagged bar code, particularly a 1D tagged bar code, is by the elimination of the human readable portion of a bar code. Another method would be to deliberately change the human readable portion of a bar code to be irrelevant and unrelated to what is actually contained in the tagged bar code.

A tagged bar code that is readable by a bar code scanner can typically be printed using a wide variety of standard inks on a wide variety of label materials and/or paper types. One method to prevent fraudulent photocopying of a tagged printed bar code that is to be applied to an asset is to print the tagged bar code on self-destructing material that comes apart if an attempt is made to peel it off the asset that has been affixed to.

A tagged printed bar code can be made more secure if it is printed with a thermochromic ink, available from companies such as, but not limited to, Standard Register. Thermochromic ink changes color or disappears when warmed and returns back to the original color upon cooling, thus making it impossible to copy using photocopiers. They are also difficult to counterfeit. A tagged printed bar code can be printed using a standard ink and a disappearing thermochromic ink in order to cause the tagged printed bar code to morph into another image. The morphed bar code would translate into a different identification number and would alert a back-end database of a fraudulently tagged printed bar code. Thermochromic inks are an effective deterrent to fraud.

Another kind of tagged printed bar code can be presented using the aforementioned 3D bumpy bar code technology. One advantage of using a 3D tagged bumpy bar code to represent tagged data is that it cannot be fraudulently photocopied. Also, 3D bumpy bar code readers are currently not as ubiquitous as standard bar code readers designed to read tagged printed and/or tagged video bar codes.

A further security measure for tagged printed bar codes is the printing of the tagged bar code using invisible inks. As an example, PhotoSecure, Inc. manufactures photoluminescent inks (SmartDYE™) and related scanners. Fluorescing inks are invisible to the naked eye and provide a moderate amount of protection against copying. By mixing SmartDYE™ components, PhotoSecure can customize each ink batch, if necessary, to have unique fluorescing characteristics. These include the specific frequency of light needed to activate them, the manner in which their fluorescence fades when the photo stimulus is removed, the exact color of the fluorescence, and other properties which can be detected and measured by their scanners. PhotoSecure's scanners are equipped with a strobe light source, a CCD image sensor, and solid-state memory for recording both the response profile of each authentic secure tagged bar code.

Additionally, a tagged bar code may also include a digital watermark. Digimarc Corporation's digital watermark technology embeds a special message in an image by making subtle, imperceptible changes to the original data content of an image. A digital watermark that has been fraudulently copied can be detected using a proprietary scanner.

Another form of security for a tagged bar code is the intentional visual encryption of the tagged bar code by applying an algorithm to the tagged data to scramble the position of the characters being displayed. The visual encryption algorithm could use a PIN or other unique identifier as a variable to drive the encryption algorithm.

Another form of security for tagged and or un-tagged bar codes is the creation of a single PDF-417 2D bar code, and then subsequently the division of the original 2D bar code into at least two parts. All the sub-divided parts would need to be present in order to be scanned and decoded. The original PDF 417 2D bar code could also be hashed and/or PIN protected in addition. Some of the sub-divided parts could be printed, and others could be presented on video displays.

Any combination or all of these technologies may be employed to add security to a tagged bar code of the present invention and insure authenticity.

Video Bar Codes

In addition to the tagging of bar codes as described in the present invention, the inventors have greatly extended the utility of bar codes by creating another format for their use, video displays. Tagged video bar codes give rise to a tremendous opportunity to introduce new applications for bar codes, such as in prepackaged software, custom software, television, digital radio, the Internet, and ATM machines.

Tagged video bar codes are an efficient means for data collection and can be 1Dimension (1D), or 2 Dimension (2D). Common standardized 1D bar code formats that have been successfully read off a video display include, but are not limited to, Code 39, Code 128, and Interleaved 2 of 5. A common standardized 2D bar code format that has been successfully read off a video display includes, but is not limited to, PDF 417. There are also various proprietary 1D and 2D bar code formats. A high scan rate CCD or linear imager bar code reader is used to read the tagged video bar code, and translates the image of the bar code into digital data.

Tagged video bar codes possess several inherent qualities that offer significant advancements in this digital age. First, the use of tagged video bar codes can allow for a two-way interchange of data.

Secondly, the use of tagged video bar codes is not constrained by operating systems, software, hardware, or the compatibility of such systems. Any data represented by a tagged video bar code may be universally interchanged across disparate systems without expensive and rigid middle-ware requirements. By simply scanning a video-displayed bar code in a similar manner as performed at the grocery store, data is instantaneously transferred.

Tagged 1D or 2D bar codes are a unique and simple way for two or more parties to exchange information, using HTML, SGML, XML, proprietary data tags, etc. Tagged bar codes allow for an ad-hoc or standardized medium to exchange data between parties, applications, businesses, and industries. As information is captured and decoded, data tags are used to delineate and identify data for input into a standardized form, database, application, etc. Tagged bar codes greatly expand the application for bar codes. Tagged bar codes can be one or two-dimensional bar codes, which can be presented for scanning in either printed or video formats.

Electronic documents with tagged video bar codes are easily created using existing software, and may be viewed with a variety of different video displays. Tagged video bar coded data is then captured and interchanged with any software application running on any operating system without using middle-ware. This is an easy-to-implement, inexpensive system. As an example, small vendors currently cannot afford the extensive monetary investment required for special middle-ware to do business with companies such as Wal-Mart, Sears, Dayton-Hudson, General Motors, etc. Tagged video bar coded electronic documents such as, purchase orders, advance ship notices, invoices, medical prescriptions, insurance applications, etc. create a new, easy-to-implement form of EDI in order to interact with a business information system.

Tagged video bar codes have broad application and may be transmitted over any video medium. Televisions, PDA's, cell phones, and/or computer monitors displaying a tagged video bar code may be scanned to exchange data into another format or application. This will prove beneficial in B2B and B2C transactions where the style, format, and content of data transmission needs to be re-formatted for processing or proprietary purposes. In this application, medium to small size companies will be empowered to exchange data across disparate systems and fulfill transactions immediately, without middle-ware or third-party administrators typically required to execute an electronic transaction.

Tagged video bar codes provide a new format of presenting bar codes, which extends their application to general business environments and provide the following benefits: 1) universal data interchange across any operating system and software platform at point of use without middle-ware, 2) enhances the functionality of B2B and B2C transactions without the need to re-key data, 3) reduces the need for complex integration in management information systems, 4) an easy-to-use, interactive two-way electronic data interchange. Tagged video bar codes may be available locally on a device, such as a computer, or may be obtained remotely and viewed as described in U.S. patent application Ser. No. 09/753,863 to Melick, et al, herein incorporated in its entirety by referenced.

As an example, enhanced electronic documents can display and transmit tagged video bar codes on-line using an Internet web page, or email. Once the bar code reader has captured the bar coded data from a computer monitor, laptop, television, cell phone, PDA, etc. it can be input into any software application on any operating system without the use of middle-ware. Optionally, in a facility that has wireless access points on its wide area network (WAN), or local area network (LAN), these enhanced electronic documents with tagged video bar codes may be accessed anywhere.

Data Tags

In the present invention, data tags can be used to facilitate data interchange. Data tags may be an integral part of the source data, which can be used to facilitate the input of data into an electronic document. Primarily in the present invention, data tags are an integral part of the data that has been summed up as one or more 1D and/or 2D bar codes by an electronic document or related software, firmware, or hardware application, in order to facilitate data interchange to target software applications and/or devices. Also, data tags may be used by the target software application and/or target device to facilitate various activities by target software application and/or target device.

Proprietary Tags

As an example of proprietary data tags, Chart 1 contains the actual tagged demographic information contained in a 2D bar code displayed on the back of an Iowa driver's license.

CHART 1

Tagged Data From A State Of Iowa
Driver's License 2D Bar Code Scan

| Tagged Data | Tag | Data Element |
| --- | --- | --- |
| DABSMITH | DAB | SMITH |
| DACJOHN | DAC | JOHN |
| DADDAVID | DAD | DAVID |
| DAL101 MAIN STREET | DAL | 101 MAIN STREET |
| DANCEDAR RAPIDS | DAN | CEDAR RAPIDS |
| DAOIA | DAO | IA |
| DAP52401 | DAP | 52401 |

The proprietary tags in the above table provide the key to decoding the tagged data contained in a string.

XML Tags

XML (eXtensible Markup Language) is an open standard that is a subset of SGML (Standardized General Markup Language). The term "XML" has come to mean a whole family of related standards.

XML was developed to overcome the shortcomings of HTML (Hypertext Markup Language) which much of the data on the Internet is tagged in. HTML describes how data is structured on a Web page. To view content created in HTML, you must generally load an entire Web page, even if you just want one little piece of information on the page. XML allows people to chop data into smaller pieces, label them, and make them available on the network. That way, an intelligent software program can reach over the Internet and retrieve just the information wanted—say, movie times or item numbers—without having to load an entire Web page. That should also make data more accessible from devices such as handheld computers and cell phones, which tend to have slower Internet connections and smaller screens.

The elements of an XML document can be formally specified using a DTD (Document Type definition) just as SGML documents are specified. If a DTD exists for an XML document, XML parsers with the appropriate extensions can test the XML document against the DTD. A document that passes such a consistency and validation test is said to be valid. The Microsoft Internet Explorer 5 parser will validate an XML document.

Unlike SGML, an XML document does not have to have a companion DTD document. An XML document that does not have a DTD can be tested for conformance with the general requirements of XML. A document that passes this lesser standard is said to be "well formed". All XML parsers test to see that an XML document is well formed. The W3 Consortium requires parsers to verify that a document is well formed and to fail to render an XML document that fails that test.

XML is a hierarchical set of entities. An entity is one or more elements. Elements can contain one or more attributes and text. XML provides a formal syntax that defines elements, attributes and text. At the syntax description level XML is deceptively simple when compared with a tag language like HTML. XML simply provides the container used to create a language like HTML. In and of itself it really does very little. For that reason it is easy to define and specify.

Data Sources for Electronic Documents

Electronic forms can receive tagged or untagged data input from sources, including, but not limited to keyboards, touch screens, voice, voice recognition technology, computer-telephone interfaces, magnetic stripe, RFID tags, Smart Cards, electronic sensors, 3D bumpy bar codes, remotely viewed or local 1D and/or 2D bar codes displayed on driver's licenses, national identification cards, social security cards, military identification cards, company identification cards, business cards, financial transaction cards including, but not limited to, credit cards, check cards, and ATM cards, health plan identification cards, purchase receipts, warranties, bills of lading, purchase orders, invoices, sales orders, insurance cards, statements of account, work orders, drawings, photographs, blueprints, packing lists, UCC forms, contracts, redemption coupons, newspapers, magazines, products, product packaging, vehicles, shipping containers, pallets, etc.

RFID

A source of tagged or un-tagged data input to an electronic form may be radio frequency identification (RFID) tags. RFID is well known in the art and is an automatic data capture (ADC) technology comprised of tags, which are microprocessors, and fixed or mobile scanners known as readers, or interrogators. RFID chips consist of three basic types; read-only, write-only, or read-write. Interrogators read and/or write data from RFID chips via low power radio frequency (RF) signals. The data captured by an interrogator can be transferred to a host computer via wire or wireless communication links. An RFID tag may be either an active or passive type. Active type RFID chips are powered by a battery, whereas passive type RFID chips are powered by RF energy generated by an interrogator. RFID systems may operate on one of several frequencies, which include, but are not limited to 125-134 kHz, 13.56 MHz, 420-450 MHz, 868-915 MHz, 2.4 GHz, and 5.8 GHz. RFID tags, which include tagged data, used in the present invention can be of an open standard type, or a proprietary standard.

To add a level of security, an RFID circuit may be printed directly on a tag using technology developed by a company, such as Cypak. Such an RFID tag printed on a self-destructing material would destroy the RFID circuitry and render the tag useless.

Magnetic Stripe

Another source of tagged or un-tagged data input to an electronic form may be via a magnetic stripe. Currently, most financial transaction cards use magnetic stripes to capture, store, and access information relevant to a particular financial transaction card. The American National Standards Institute standard, ANSI X4.16, "American National Standard for Financial Services-Financial Transaction Cards-Magnetic Stripe Encoding", defines the physical, chemical, and magnetic characteristics of the magnetic stripe on the card. The standard defines a minimum and maximum size for the stripe, and the location of the three defined encoding tracks. (Some cards have a fourth, proprietary track.) Track 1 is encoded at 210 bits per inch, and uses a 6-bit coding of a 64-element character set of numerics, alphabet (one case only), and some special characters. Track 1 can hold up to 79 characters, six of which are reserved control characters. Included in these six characters is a Longitudinal Redundancy Check (LRC) character, in order that a card reader can detect most read failures. Data encoded on track 1 includes personal account number (PAN), country code, full name, expiration date, and "discretionary data". Of course, the discretionary data is anything the issuer wants it to be and can be tagged for use with the present invention. Track 1 was originally intended for use by airlines, but many Automatic Teller Machines (ATMs) are now using it to personalize prompts with a user's name and a user's language of choice. Some credit authorization applications are starting to use track 1 as well.

Track 2 is encoded at 75 bits per inch, and uses a 4-bit coding of the ten digits. Three of the remaining characters are reserved as delimiters, two are reserved for device control, and one is left undefined. In practice, the device control characters are seldom used. Track 2 can hold up to 40 characters, including an LRC. Data encoded on track 2 includes personal account number (PAN), country code (optional), expiration date, and discretionary data. Again, on this track the discretionary data could be tagged for use with the present invention. In practice, the country code is seldom used by United States issuers. Later revisions of this standard added a qualification code that defines the type of the card (debit, credit, etc.) and limitations on its use. As an example, American Express (AMEX) includes an issue date in the discretionary data. Track 2 was originally intended for credit authorization applications. However, track 2 is commonly used by ATMs and has a personal identification number (PIN) offset encoded in the discretionary data. The PIN offset is usually derived by running the PIN through an encryption algorithm with a secret key. This allows ATMs to verify a PIN when the host is offline, generally allowing restricted account access.

Track 3 uses the same density and coding scheme as track 1. The contents of track 3 are defined in ANSI X9.1, "American National Standard—Magnetic Stripe Data Content for Track 3". There is a slight contradiction in this standard, in that it allows up to 107 characters to be encoded on track 3, while X4.16 only gives enough physical room for 105 characters. Actually, there is over a quarter of an inch on each end of the magnetic stripe that is unused, so therefore there is sufficient room for the data. In practice, that many characters are seldom used. The original intent was for track 3 to be a read/write track (tracks 1 and 2 are intended to be read-only) for use by ATMs. It contains information needed to maintain account balances on the card itself. Track 3 is rarely used for this purpose, because it is easy to defraud. Track 3 could be used to contain tagged data which could be used by the present invention.

Other standards for magnetic stripe include, but are not limited to, ISO Magnetic Stripe Card Standards 7810, 7811-1, 7811-2, 7811-3, 78-11-4, 7811-5, 7811-6, and 7813.

MICR

Another source of tagged or un-tagged data input to an electronic form may be via magnetic ink character recognition (MICR) technology. Magnetic ink character recognition is a character recognition system that uses special ink and characters. A document that contains magnetic ink is read by passing it through a MICR reader, which magnetizes the ink and then translates the magnetic information into characters.

MICR technology is most widely used by banks to read the numbers encoded at the bottom of a check.

OCR

Another source of tagged or un-tagged data input to an electronic form may be via optical character recognition (OCR) technology.

OCR has been employed to speed the collection of human readable data, in the form of special optical character fonts, from scanned paper forms. Even though OCR speeds the data collection process, it is still an expensive method due to the error-checking required to insure that correct data has been captured and input.

Optical character recognition (OCR) was one of the earliest Auto ID technologies used in retail applications in the mid-1980's. Today, OCR is currently part of resurgence because of improved reading equipment that is much more accurate, and recognizes a wider range of type styles than earlier equipment.

OCR is typically used to read selected areas of text (as opposed to text recognition software that process full pages of text). OCR is both human- and machine-readable and suited for use with account numbers or short data strings.

OCR readers scan the data in much the same way bar code scanners do: either by moving the document past the scanner or moving the scanner over the document. The scan produces a "picture" of the text that is then analyzed for characteristic features. Features are then matched to specific letters or numbers for output.

ICR

Another source of tagged or un-tagged data input to an electronic form may be via intelligent character recognition (ICR) technology.

ICR has been employed to speed the collection of human readable data, in the form of handwriting and machine printed or typed characters, from scanned paper forms. Even though ICR speeds the data collection process, it is still an expensive method due to the error-checking required to insure that correct data has been captured and input.

3D Bumpy Bar Codes

The present invention previously described the use of 1D and 2D tagged printed or video bar codes as a means for interchanging data efficiently. Another source of tagged or un-tagged data input to an electronic form may be via what is commonly known as a bumpy bar code. Bumpy bar code technology uses 3D marks, which can be placed on virtually any metal, plastic, rubber, or composite surface. These marks are expressed by highs and lows in surface height, rather than variations in black and white, as is the case with traditional bar coding. To read the mark, a bumpy bar code reader illuminates the bar code with a laser, captures the reflected image in a two-dimensional Charge-coupled Device (CCD). A Digital Signal Processor (DSP) is used to analyze the angular displacement between the laser and CCD array, and allows detection of the differences in height across the bumpy bar code.

Data Obtained Via Voice Recognition Technology

Another source of tagged or un-tagged data input to an electronic form may be via voice recognition technology. Tagged voice data may be input via XML tagged voice recognition technology known as XVR, or XML Voice Response. XVR applications use recorded audio prompts and voice recognition to convey and gather information. XVR is the integration of traditional voice phone calls, automated Interactive Voice Response applications, voice recognition, with XML technology, which include specific languages for this application, which include, but are not limited to, Voice XML and CCXML. XVR provides comfortable, anytime, anywhere access to information from any telephone.

Data Obtained Via Microfilm and Microfiche

Microfilm is an analog storage medium for books, periodicals, legal documents and engineering drawings. Its most standard form is a roll of black and white 35 mm photographic film. Another form, more common for engineering drawings, is a Hollerith punch card that mounts a single exposure. Most microfilm media have a digital indexing system exposed on the edge of each image, but these data are not required to use the microfilm, but rather to support automated retrieval systems. Microfilm is not the most compact analog microform in wide use.

The microfilm medium has numerous advantages:

First, it is compact, with far smaller storage costs than paper documents. Generally, a year of a periodical in microfilm form takes 10% of the space and 3% of the weight of its paper version.

Second, it is lower cost than a standard subscription. Most microfilm services get a bulk discount on reproduction rights, and have lower reproduction costs than a comparable amount of printed paper.

Third, it is a stable archival form. Most library microfilms use polyester with silver-halide dyes in hard gelatin, with an estimated life of 500 years in air-conditioning. In tropical climates with high humidity, fungus eats the gelatin used to hold silver-halide. In the tropics, diazo-based systems with shorter archival lives (20 years) are preferable, because they have polyester or epoxy surfaces.

Fourth, since it is analog (an actual image of the original data), it is easy to view. Unlike digital media, the data format is instantly comprehensible to persons literate in the language; the only additional equipment that is needed is a simple magnifying glass. This reduces the possibility of obsolescence.

The medium has numerous disadvantages:

The principal disadvantage of microfilm is that the image is too small to read with the naked eye. Special readers are required to project full-size images on a ground-glass screen or a flat reading surface.

Hard-copy reproduction: A conventional photocopier cannot reproduce the images and a special combined scanner/printer is required. Libraries using microfilm often have a very limited number of these viewers that can produce a photocopy of an image, for a nominal fee.

Storage space: Shelf space is required to maintain an efficient archive as well as a safe and secure storage environment.

Actual reproduction: the microfilm itself can only be reproduced a limited number of times, while digital media regenerate and often include error detection and correction schemes.

Microfilm and Microfiche Uses

Systems that mount microfilm images in punch cards have been widely used for archival storage of engineering information.

For example, when airlines demand archival engineering drawings to support purchased equipment (in case the vendor goes out of business), (as of 1999) they normally specified punch-card-mounted microfilm with an industry-standard indexing system punched into the card. This permits automated reproduction, as well as permitting mechanical card-sorting equipment to sort and select microfilm drawings.

Hollerith-mounted microfilm is roughly 3% of the size and space of conventional paper or vellum engineering drawings. Some military contracts around 1980 began to specify digital storage of engineering and maintenance data because the expenses were even lower than microfilm, but these programs are now finding it difficult to purchase new readers for the old formats.

Microfiche is more compact than microfilm it is normally used to provide a comprehensive research library in institutions (such as small college libraries) that could not otherwise afford the floor space. It was invented in 1961 by Carl O. Carlson an employee of the National Cash Register Co. The patent was issued in 1965.

Each microfiche card holds about 100-130 pages depending on the size of the original. A library of 20,000 microfiche, 10,000-20,000 books, fits in a cabinet about 1.5×0.5×2 meters. Some companies specialize in providing such libraries to institutions.

Microfiche is normally used to keep copies of books, and sometimes for periodicals and newspapers. Its most standard form is a clear plastic card, about 10 cm (4 in) by 15 cm (6 in). Usually the title of the work is in visible lettering along one edge. The most common reduction ratio is 24×, with 7 rows of 14 page images each fitting on a single microfiche. Some microfiche have a digital indexing system exposed on the edge of the card, or each image. This data is not required to use the microfiche, but rather to support automated retrieval systems. Microfiche is not as widely used as microfilm.

The medium has numerous advantages:

It is compact, with far smaller storage costs than paper documents. Generally, a book or a year of a periodical fits on one fiche and takes 0.05% of the space and weight of the paper work.

It is lower cost than a paper copy. Most microfiche services get a bulk discount on reproduction rights, and have lower reproduction costs than a comparable amount of printed paper ($5 per fiche in 2003).

It is a stable archival form. Most library microfiche use polyester with silver-halide dyes in hard gelatin, with an estimated life of 500 years in air-conditioning. In tropical climates with high humidity, fungus eats the gelatin used to bind the silver-halide. In the tropics, diazo-based systems with lower archival lives (20 years) are preferable, because they have polyester or epoxy surfaces.

Since it is analog (an actual image of the original data), it is easy to view. Unlike digital media, the data format is instantly comprehensible to persons literate in the language; the only additional equipment that is needed is a simple magnifying glass. This reduces the possibility of obsolescence.

There are also some disadvantages of the medium:

The principal disadvantage of microfiche is that the image is too small to read with the naked eye. Libraries must use special readers that project full-size images on a ground-glass screen.

A significant disadvantage is that when stored in the highest-density drawers, it is easy to misfile a fiche, which is thereafter unavailable. Some libraries therefore keep the microfiche cabinet in a restricted area, and fetch fiches on demand. Some fiche services use lower-density drawers with labeled pockets for each card.

Another disadvantage is that a conventional photocopier cannot reproduce the images.

Libraries using microfiche often have a few viewers that can produce a photocopy of an image, for a nominal fee.

The final disadvantage is that microfiche can only be reproduced a limited number of times, while data stored on digital media does not degenerate and control software often include error detection and correction schemes.

The present invention's documents can be stored as analog documents on microfilm and/or microfiche. The analog data being preserved can also be represented as digital information in the form of one or more tagged and/or un-tagged bar codes. Thus the present invention can use microfilmed and/or microfiched bar coded documents as sources of data to feed into an e-Form, or become the targeted storage medium of the present invention's forms that summarize data as one or more tagged and/or un-tagged bar codes.

Devices

Bar code readers of one of the following types: CCD, imagers, laser scanners may be hand-held devices, or incorporated into SDIO cards that can be connected to a cell phone or PDA, or integrated into devices such as, but not limited to, a cell phone, PDA, smart phone, etc. In addition, bar code scanners can be incorporated into replaceable battery packs for a cell phone, PDA, smart phone, etc. Also, a bar code scanner can be incorporated into a sled that is meant to be used with a cell phone, PDA, smart phone, etc. This list is meant to be representative, but not exhaustive.

Data Targets for Electronic Documents

Data targets that can receive the tagged information summed up on an electronic document in the form of one or more 1D and/or 2D bar codes can be captured from either a printed version of the electronic document, or a video displayed version of the electronic document. The video bar code may come from either a local, or remotely viewed source. The captured tagged data string is parsed; the data tags are used to route and/or input and/or exchange data into a variety of data targets including software applications, such as, but not limited to, a database, a spreadsheet, a web page, a word processor, another electronic document, etc. The tags may remain with the output data, or alternatively may be stripped from the data by the target application.

The tagged data captured from one or more 1D and/or 2D bar code(s) in an electronic document, either directly off a video display or from a printed version of the document, can be output to a data target device that is capable of receiving and/or using tagged data, such as but not limited to, an RFID tag, Smart Card, magnetic stripe, bar code printer, OCR encoder, MICR encoder, ICR encoder, cell phone, television set-top box, telecommunication network router, telecommunication network switch, telecommunication network hub, ATM machine, laptop computer, PC, PDA, pager, text messaging device, touch screen, keyboard, mouse, etc.

In a preferred embodiment of the present invention, a business user or consumer will create electronic generated documents which include one-dimensional, tagged bar coded information, create specific style sheets to define bar coded data tags, publish documents with tagged bar coded information, scan video displayed documents using a high scan rate CCD or linear imager, or scan printed documents using any type of applicable bar code reader to capture tagged bar coded information, cache tagged bar coded information, parse the tagged bar coded information and applicable software applications, strip the bar coded data tags, and input stripped bar coded data into the applicable software application as shown in FIG. 1.

Initially, a user of the present invention will make a decision 101 to tag or not tag bar codes in an electronic document. If the tagged bar codes are required, the user will create a style sheet file 102. An example of a style sheet used by a sender is shown in FIG. 3. The style sheet will be capable of automatically generating an identifier, such as the number 12345 as shown in FIG. 3, or the sender may choose to manually assign a specific identifier. The style sheet identifier is a hyperlink to the style sheet file 102, which is used by electronic document "A" 103, to decode tagged bar coded data.

Style sheet file 102, is stored in a library 110. Library 110 may use a local hard drive 111, or network hard drive 113 to store this file. Optionally, style sheet file 102 may be e-mailed to a selected user 112.

Figure 2:
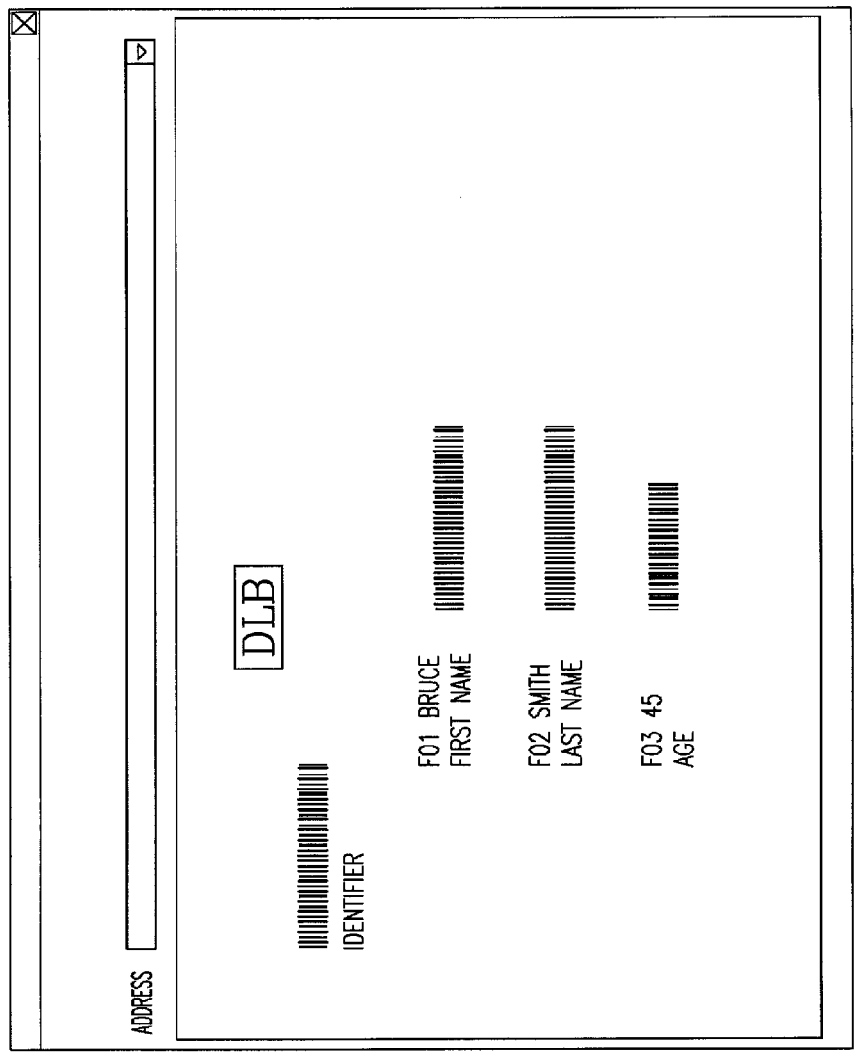
FIG. 2 is a pictorial representation of a document containing tagged bar codes.

A style sheet file 102 is used to create an electronic document "A" 103 with tagged bar codes. An example of document "A" 103 is depicted in FIG. 2 using software such as MICROSOFT EXCEL or WORD on a PC to create an electronic document. In the present invention, such software creates documents that contain electronic representations of bar coded information through the use of bar code fonts which reside on the local computer and are commonly available today from companies such as Azalea, TAL Technologies and Wasp Bar Code.

If the decision 101 does not require data tagging and parsing, an electronic document "A" 103 is created with un-tagged bar codes. Electronic document "A" 103 is posted 104, to a library 110. Library 110 may use a local hard drive 111, or network hard drive 113 to store electronic document "A" 103. Optionally, electronic document "A" 103 may be e-mailed to a selected user 112.

Figure 7:
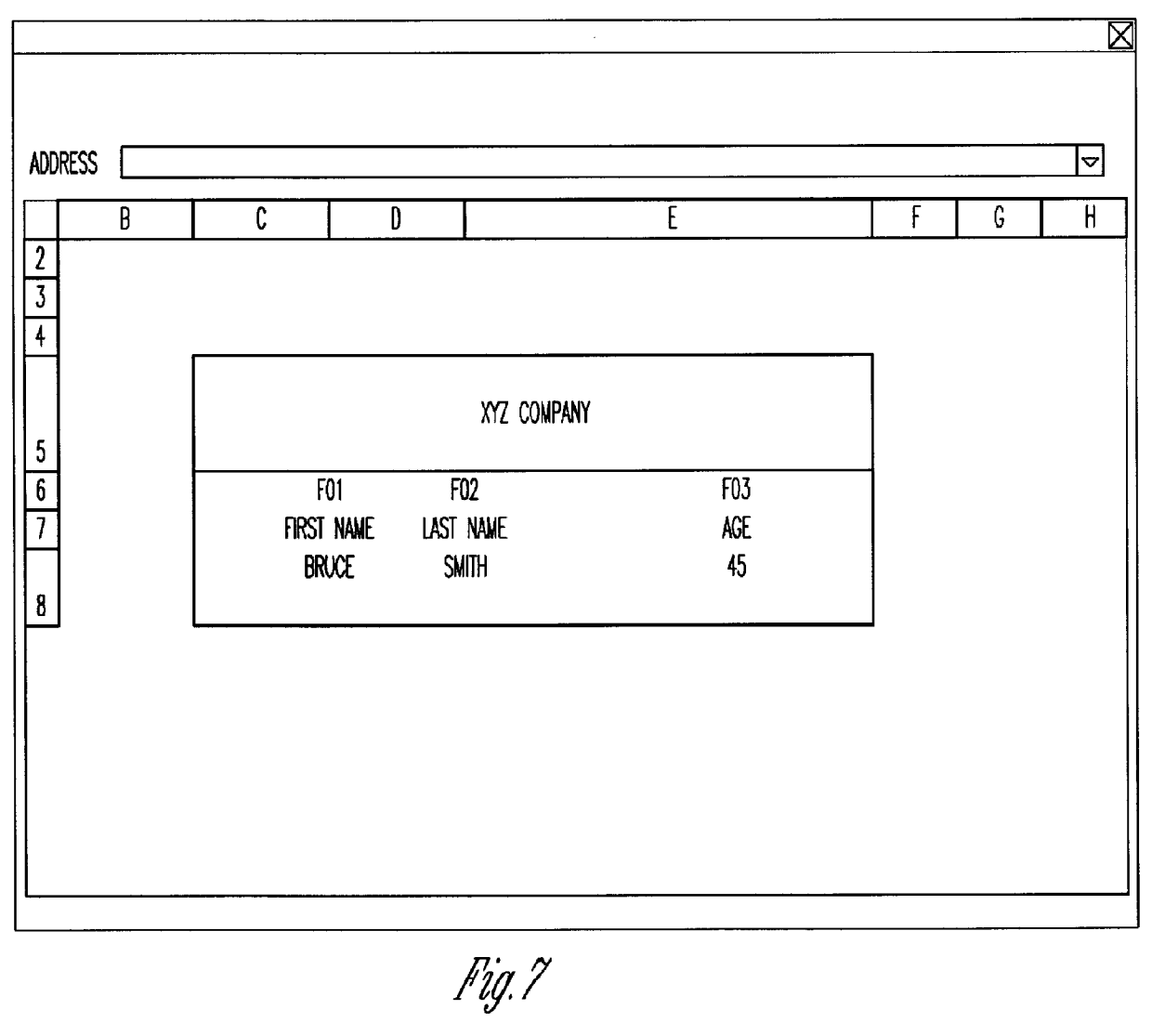

A receiver 121 opens electronic document "A" 103 in a window on their computer. The receiver 121 also opens electronic document "B" (as shown in FIG. 7) 122, in a separate window on their computer in order to receive bar coded data contained in electronic document "A" 103.

A decision 123 is made to determine if electronic documents "A" 103 and "B" 122 uses a style sheet file 102. Integrated software, such as Intuit's Quicken, QuickBooks, QuickBooks Pro, etc. would incorporate parsing software, such as SAX commonly available from companies such as Stellent and, according to the present invention, and use style sheets in two ways. In the first method, a common style sheet is used by both sender and receiver. When a common style sheet is used, the style sheet identifier is scanned 124 in document "A" 104 in order to launch the hyperlink to open the style sheet file 102, stored in library 110.

Figure 6:
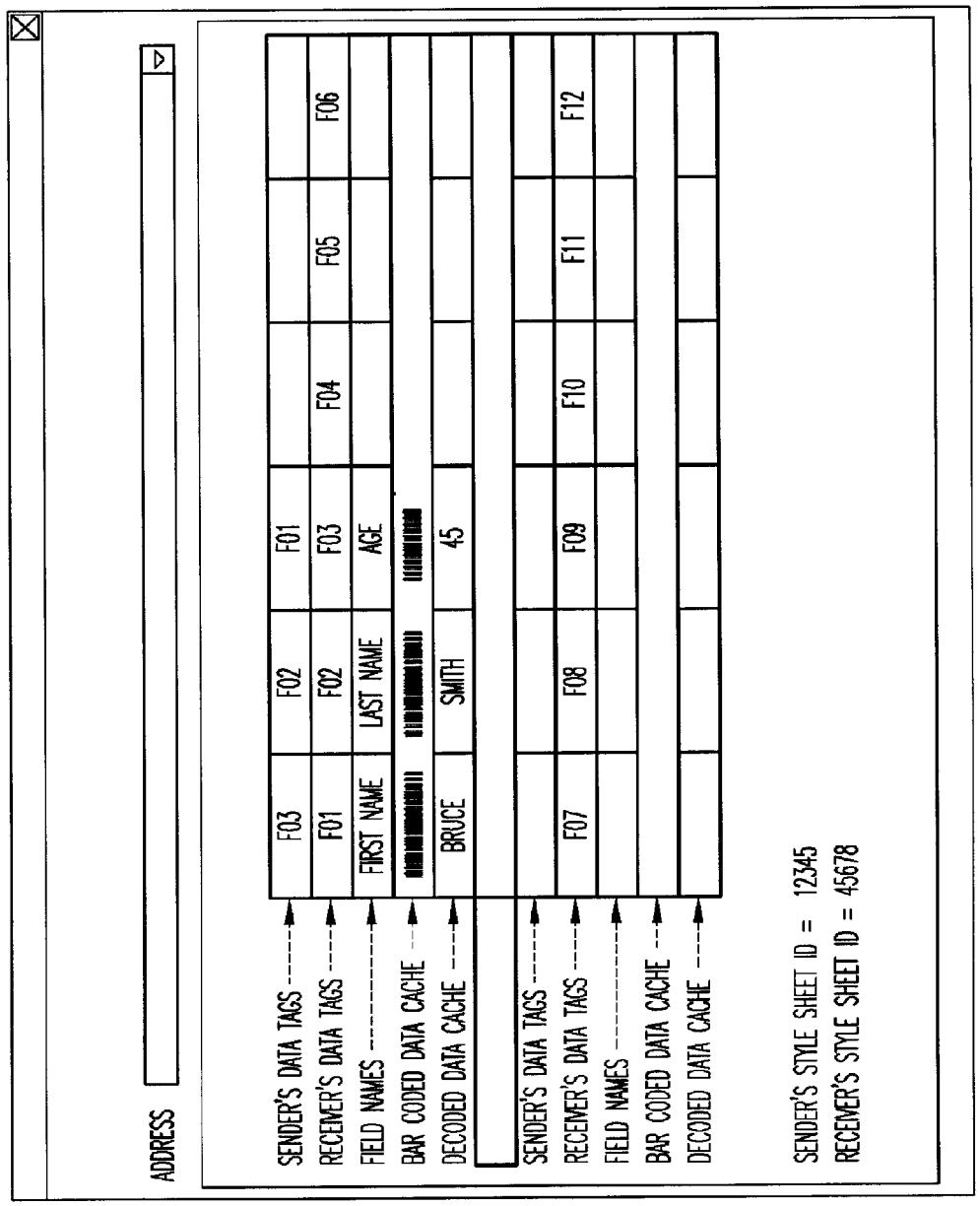
FIG. 6 is a pictorial representation of a data cache.

In the second method, two style sheets each using different "function key tags" to represent the same data fields can be used. When two different style sheets are used in step 124, the parsing and data cache application will allow the user to scan the sender's style sheet identifier and also the receiver's style sheet identifier (as shown in FIG. 4) and cross-correlate them as shown in FIG. 6.

In step 125, the style sheet file is loaded into the parsing and data cache application of the integrated software.

In step 126, the receiver scans tagged bar codes in electronic document "A" 103. The scanned tagged bar coded data is parsed and sent to a data cache, as shown in FIG. 6. In step 127, the parsing and data cache application use logic and computer routines to identify the scanned bar coded data by "function key tag", match the scanned bar coded data to the appropriate field in electronic document "B" 122, strip the "function key tag", and input the stripped bar coded data into the appropriate field in electronic document "B" 122.

In step 123, if the decision is made that electronic documents "A" 103 and "B" 122 do not require a style sheet, the receiver in step 129, scans the un-tagged bar coded information and manually chooses the appropriate field to input the data into electronic document "B" 122.

In step 128, the receiver makes a decision to scan another document bar coded electronic document, or to end the bar code data interchange.

In an alternate embodiment of the present invention, a business user or consumer will create electronic generated documents which include two-dimensional, tagged bar coded information, create specific style sheets to define bar coded data tags, publish documents with tagged bar coded information, scan video displayed or printed documents with a high scan rate LED bar code reader to capture tagged bar coded information, cache tagged bar coded information, parse the tagged bar coded information, strip the bar coded data tags, and input stripped bar coded data into the applicable software application as shown in FIG. 1.

All the steps described in the preferred embodiment of the present invention apply to the alternate embodiment of the present invention. The difference between the two embodiments is the type of data tagging used to identify data. For instance, 2D bar codes may use the General Motors common shipping label format, GM 1724-A, or another industry specific format for tagged information.

The sender's field tags can be identified using tags such as XML tags or "function key tags" F01, F02, F03, etc., which relate to "F1, F2, F3" respectively on a standard computer keyboard, or proprietary data such as, but not limited to those encoded in the 2D bar code on a state issued drivers license, like the State of Iowa. As an example, two companies might agree to exchange data for various customers contained in their respective databases: first name, last name, and age. Using the appropriate "function key tag" in the style sheet to identify particular data elements, the two companies would agree the "function key tag" for first name data is F01, the "function key tag" for last name data is F02, and the "function key tag" for age data is F03. The style sheet would be programmable on-the-fly using the style sheet to tag data fields with the appropriate "function key tag". The style sheet would also automatically tag the data elements from the database with the appropriate "function key tag".

This embodiment of the present invention greatly reduces the number of transaction errors and greatly increases the speed of data interchange.

Data elements not identified by the same "function keys" could be used by multiple users, but this adds another step in the transaction process, and introduces the possibility of more input errors.

Figure 5:
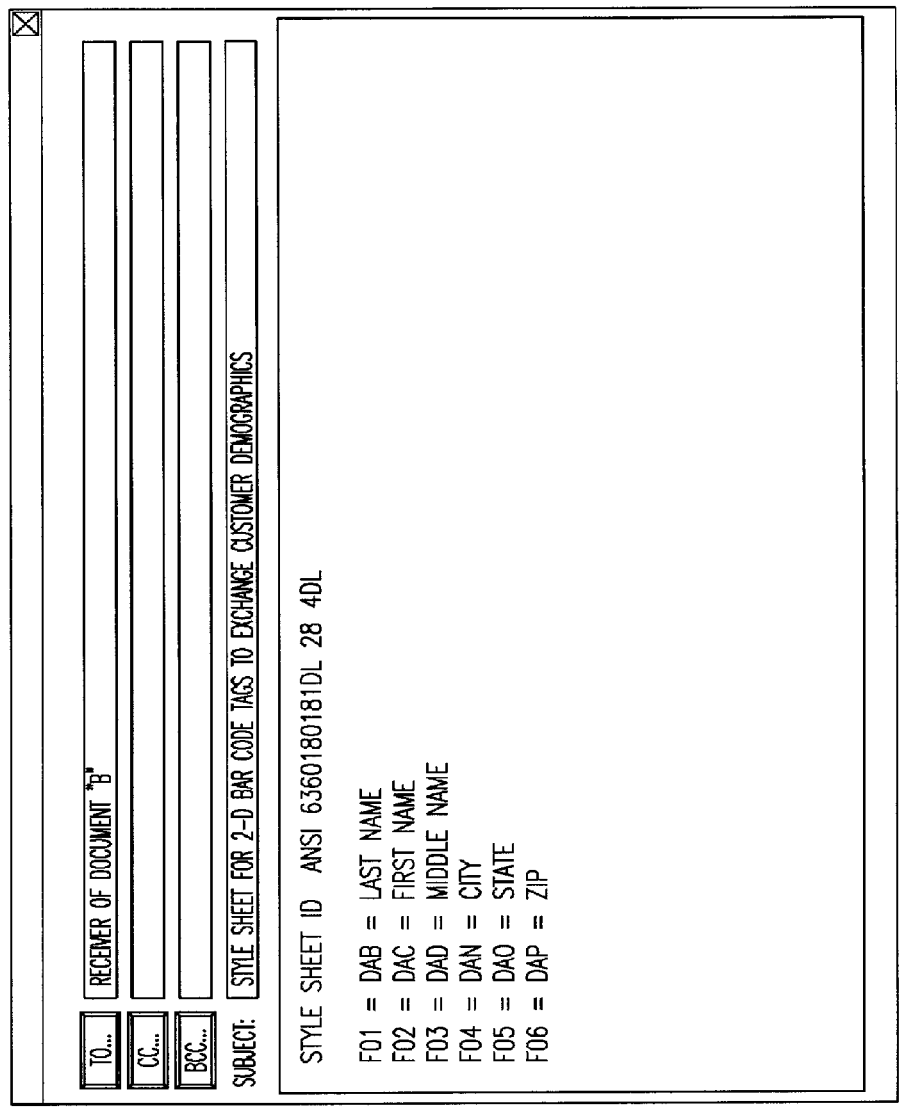
FIG. 5 is pictorial representation of a style sheet used to identify the fields and tags for the tagged two-dimensional bar coded data shown in FIG. 8.

FIG. 5 is a pictorial representation of a style sheet with data tags and field names contained in a two-dimensional bar code, such as that commonly found on a driver's license.

FIG. 8 is an example of two-dimensional bar code data tags from a driver's license in which the last name "Smith" is tagged with the letters "DAB", the data tag for the first name "John" is the letters "DAC", etc.

Figure 9:
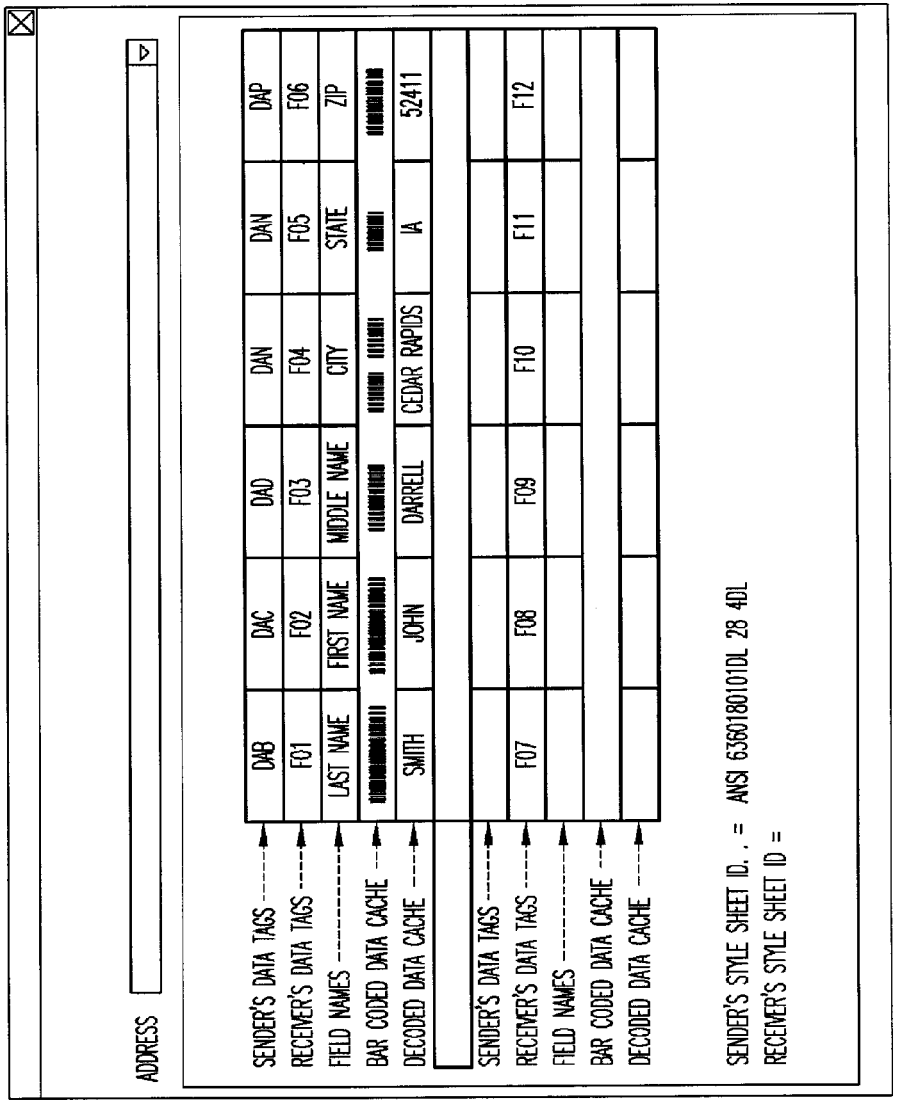
FIG. 9 is a pictorial representation of a data cache which has received the two-dimensional, tagged bar coded data represented in FIG. 8.

FIG. 9 is a pictorial representation of the parsed and cached data, as shown in FIG. 8, ready for input into electronic document "B", step 127.

The present invention provides for numerous uses of tagged bar codes, including numerous uses of style sheets used with tagged bar codes. For example, the present invention contemplates that the IRS and state governments can use tagged bar codes and style sheets in exchanging information with taxpayers and each other.

An electronic document, such as a PDF tax form, is created with a number of fillable forms to be used by a taxpayer or his or her tax preparer or other user. The user enters information into the fillable form fields and a bar code is generated based on the information contained in the fillable form fields. The bar code is a part of the document so that when the document is printed, the bar code is printed and the bar code can be scanned from the paper document. This is useful because information acquired through scanning a bar code is generally more reliable and less costly than manual data entry or OCR.

The present invention allows the bar code to be represented in the electronic document through use of tags. The tags can, for example, be XML tags that specify field names and field values. Software for using the electronic document interprets the tags to display the bar codes, and preferably allows for updating the form fields and then updating the bar codes.

Preferably, the entire electronic document or the form field information can be stored or sent so that the information contained within the form fields can be extracted. It should be appreciated that because of the tagged bar codes, the document allows for improved data interchange regardless of whether the document is in an electronic form or paper form. Thus, in the case of a tax form, the data in the form fields can be electronically sent when filing electronically. Alternatively, a paper tax form can be submitted. The bar code on the paper tax form is scanned to acquire the data from the form fields.

Because the use of tagged bar codes allows for XML and style sheets to be used, the present invention contemplates numerous variations. For example, a tagged bar code placed on a document does not need to correspond to data fields on the same document. Instead, the tagged bar code can correspond to data fields on a separate document. Thus, for example, when preparing a federal income tax return there can be multiple forms involved, including various schedules. The present invention would allow for a tagged bar code representing data in form fields of one document to be placed on a different document. Thus, for example, a 1040 type tax form could include bar codes for each schedule used. Thus, information from attached and supporting documents can be consolidated to a single document. Such a practice can be advantageous for a variety of reasons. For example, where the data is extracted from the document by scanning and decoding one or more bar codes, such a practice can reduce the number of pages that must be scanned and alleviate paper handling issues such as lost or mismatched documents which can occur if a number of related documents are submitted together.

The use of style sheets also allows for information associated with one form to be easily interchanged with information associated with another type of form. For example, information on a federal tax form can be interchanged with information on a state tax form even though the federal government and the state government choose to use different field names. The process described in FIG. 1 illustrates the methodology used. It should be apparent that because information from document A can be placed in document B, that a bar code representing data fields from document A can be placed in document B. Such a bar code may also include additional data fields not present in document A.

Video Bar Code Used for Data Interchange Examples

A system utilizing tagged video bar codes and the present invention's technology may be used to show real-time product inventory, place orders, route the order through an accounting system, make shipping arrangements, and forward the user a report. The process of executing an order online requires a sequence of events to take place. A customer may wish to replenish his/her inventory, without passing through several systems. Retailers may utilize tagged video bar codes in web sites, WebTV, television or over other mediums to index products and services in the form of an online catalog. Suppliers, who have traditionally been dependent on middleware and/or third party administrators to access and/or execute orders, will be empowered to access such requests. Tagged video bar codes also allow various enabled devices to execute order placement, processing, and fulfillment simply by using this universal medium.

When used in conjunction with a bar coded financial card, as disclosed in U.S. Patent Application Ser. No. 60/276,203 to Melick, et al, the transaction becomes instantaneous. Currently, most companies rely on expensive administrators to process electronic transactions, due in part to the complex systems necessary to manage this process and the varying degree of sophistication between trading partners. Tagged video bar codes are not constrained by these considerations, and offer universal access by simply including them in any digital transmission.

Data entry continues to challenge companies as smaller suppliers and venders continue to use paper-based systems. These companies, when equipped with tagged video bar codes may engage in collaborative commerce while data entry and interface considerations are minimized in host company systems. HTML transmissions, when wrapped in e-mail offer easy-to-use, familiar, professional invoicing and order processing capabilities for every user.

Companies, such as UPS, offer online document exchange services with various encryption techniques requiring a higher degree of security in transmission will now have a multitude of options available to them. Last year, UPS executed over 10 billion online document exchanges at a fraction of the cost associated with paper transactions.

Applications within the medical industry are numerous, from electronic commerce between insurance carriers, HMO's, and medical practitioners to demographic data relating to patients, etc. all requiring a unique tag or identifier. Currently, medical practitioners are overwhelmed with reports, regulations, files, drug prescriptions, and other patient information that requires great care in management. Not too dissimilar from a retailer who is managing thousands of stock keeping units, the consequences of mismanagement in the medical industry is significant.

Medical practitioners frequently find it necessary to exchange critical patient data with other practitioners, pharmacies, and hospitals in a timely and accurate fashion. While not an issue within networked systems, the medical industry has not made investments in infrastructure necessary to enable electronic commerce. Currently, physicians predominately use e-Mail as their primary means of communication (55%), while only 6% use e-Mail and the Internet to transport clinical information. The primary issue, according to a Harris Interactive study, has been the lack of this infrastructure investment, which has left the industry years behind other sectors. TVBC technology offers to leverage off the existing infrastructure maintained in these practices, and enable them with electronic data interchange.

As an example, in this application Document "A" 103 would be an electronic patient's chart containing bar coded information. Document "A" 103 would be available on any computer display in the hospital. As a doctor makes his daily rounds, he would use an enabled device to capture applicable bar coded information displayed on the patient's electronic chart for billing and record updates, and download the tagged bar coded information to Document "B" 122 on his disparate computer information system located in his office.

Office visits that result in a prescription to be filled are currently phoned to a pharmacy or the patient is given an order form. This entire process may be streamlined electronically with tagged video bar codes containing basic demographic data from order placement to the label that appears on a prescription. In doing so, the error rate associated with fulfilling orders would be eliminated, greater controls would exist in the distribution of drugs, and reorders may be triggered without data entry.

As an example, in this application Document "A" 103 would be an electronic prescription containing bar coded information. Document "A" 103 would be e-mailed to the pharmacy with bar coded information relating to the patient information and medication required. The pharmacist would use an enabled device to capture applicable bar coded information displayed on the patient's electronic prescription for input into Document "B" 122 on their disparate computer information system.

In financial, insurance, engineering, and law firms, there are large amounts of paper and electronic documents being passed around daily. The user would benefit from the availability of these documents in a free-flowing system that could more effectively catalog and manage documents across local networks. A document management system would use tagged video bar codes as a dynamic hyper-link to access various forms of data.

As an example, in a complicated legal preceding Document "A" 103 would be various evidence or exhibits in graphic form which are bar coded in order to launch the court overhead projection system. Document "B" 122, which are a lawyer's electronic trial notes, operate on a disparate computer system would contain tagged video bar codes which are linked to the appropriate Document "A" 103.

Law enforcement agencies and our legal system are burdened with populating numerous standardized forms and reports, requiring unique identifiers to tag and track evidentiary materials. This industry is moving rapidly to bar coding documents, which is currently printed, tagged, and then filed. Tagged video bar codes offer to streamline this process from automatic ticket generation to a free-flow of information to courtrooms, law offices, police stations, and other agencies.

Currently, county and metro law enforcement agencies are unable to exchange information due to disparate systems and universal identifiers.

As an example, a city policeman would make an arrest. Document "A" 103 would be the arrest report. The suspect is then taken to a county jail which operates on a disparate computer system. Electronic document "B" 122 which is the prisoner's record would be completed with the aid of tagged video bar coded information contained in Document "A" 103. From here the suspect would appear in court, and information contained on Document's "A" 103 and "B" 122 would be captured and entered into yet another disparate information system.

The financial industry relies on information generated from a wide spectrum of sources to analyze, record, process, and report transactions. Some of these sources include transaction clearing houses, financial exchanges, news services, and research companies. Such systems include The Dow Jones Telequote, Bloomberg, the Associated Press, Value Line, and others electronic systems that transmit data across a video monitor. Investment and financial professionals utilize these services to retrieve, process, and manipulate this data in proprietary applications for analysis. All of these systems utilize a one-way means of data transmission, serving as a reporting service verses an interactive two-way system.

As an example, Document "A" 103 would be a financial report from a company such as Dow Jones Telequote or Bloomberg, which included tagged video bar codes. Document "B" 122 would be an order placement form running on a disparate information system. An enabled device would capture tagged video bar coded information from Document "A" 103 and input the information into Document "B" 122.

While many larger institutions have customized their accounting and general ledger systems, a majority of their trading partners remain on disparate systems. In addition, small-to-medium size companies rely almost exclusively on outsourcing the accounting function or acquire various prepackaged systems. Intuit the maker of Quicken and QuickBooks dominate the prepackaged accounting software market with an estimated 80% share. By utilizing tagged video bar codes with any e-mail system, basic demographic data and billing information becomes a collaborative commerce process, without the errors associated with data entry. By using tagged video bar codes vendors will be able to reduce their costs associated with traditional paper-based systems by converting to electronic forms using tagged video bar codes, develop E-commerce capabilities, and speed up the payment process. Using QuickBooks or a similar accounting system with tagged video bar codes, allow the user to get one step closer to a paperless office, reduces the time-to-process routine procedural tasks in an error free manner, and minimizes the uncertainties associated with outstanding un-entered bills and invoices. Tagged video bar codes offer accounting department managers a new method to streamline the entire accounting process. As an example, ABC Company would use electronic document "A" 103, which would be an electronic invoice containing bar coded information. This document could be posted electronically for payment by XYZ Company. XYZ Company would use an enabled device to capture the pertinent bar coded data from Document "A" 103 and input into their Document "B" 122 which is a check writing form on their disparate computer system.

The insurance industry relies on sophisticated hardware and software systems for claims processing, billing, and information retrieval to conduct their day-to-day business. Processing centers, and the costs associated therewith represent a significant investment on the part of these companies and lack flexibility as it relates to capturing, processing, storing, and interchanging information. Insurance companies engage in large volumes of data entry, and spend millions of dollars every year on interfaces, populating forms, applications, etc. Applications within this industry are not unlike other applications discussed above.

The United States federal government, state governments, and various other public agencies maintain large databases of information that are frequently accessed by various departments, other government agencies, and the private sector. One example relates to the property tax assessment and collection division of county governments. Most frequently the assessment and collection divisions rely on the same information for different purposes in disparate information systems. Consequently, this requires information to be entered and re-entered by each division. Tagged video bar codes would allow relevant information to be easily exchanged between divisions without the need for middleware or manual re-entry. Also, tagging such documents with bar codes provide a unique tag for management control purposes, and allow various agencies dependent on such data to share these public documents as described in other applications above.

As companies rely more and more on the Internet for marketing and e-commerce transactions, it becomes increasingly difficult to add or delete information and make changes to on-line catalogs, databases, and Internet commerce forms. The use of tagged video bar codes virtually eliminates input errors, is less time consuming, requires fewer personnel, and reduces the complexity of integrating various aspects of a company's web site.

As newer software systems replace older ones, legacy systems are increasingly a problem within organizations. Companies have a difficult time getting their mainframe to "talk" with their DOS system, and in turn have trouble getting that data to "talk" with their new Windows™ systems. Video bar coding information in legacy systems would save a lot of time and expense coding systems to convert legacy data.

Tagged video bar codes offer users a multitude of options that are easy-to-use and understand, bring new functionality to existing practices, and offer the first universal means by which to communicate, through a multitude of devices.

For example, an image of a printed or video bar code can be captured at a remote location using a web cam, security cam, phone cam, etc. The image is then transmitted over a network, such as, but not limited to, the Internet. The image is received and viewed at a remote location using a device, such as, but not limited to, a PC or TV screen. The bar code being viewed is captured by either printing the bar code for decoding by a bar code scanner, or capturing the bar coded data off the video display using a bar code scanner capable of reading a VBC. This method of viewing a remote bar code combined with the present invention's use of tagged bar codes is useful One skilled in the art having the benefit of this disclosure will recognize that all the above tagged video bar code examples could also be accomplished using tagged printed bar codes to accomplish the same goals described in the present invention.

It is important to note that electronic documents may be intelligent and capable of tagging data suitable for data interchange. Alternatively, electronic documents may interact with another software application and/or hardware device in order to tag data in the form of one or more 1D and/or 2D bar codes suitable for data interchange.

It is also important to note that the electronic document that data is input to may be the same document that displays one or more 1D and/or 2D bar codes suitable for facilitating data interchange. Alternatively, another electronic document or hardware device may display one or more 1D and/or 2D bar codes suitable for facilitating data interchange.

Target Devices that can Receive Tagged Data

The previous disclosure of the present invention has focused on PCs and back-end servers as the primary target devices that can receive, decode, and use tagged bar coded data. To one skilled in the art it is obvious that other target devices could be configured to receive and use tagged bar coded data, which includes, but is not limited to, tablets, PDAs, cell phones, TV set-top boxes, RFID readers, RFID interrogators, bar code readers, microfilmers, microfichers, bar code printers, cell phones, touch screens, magnetic stripe readers, OCR readers, MICR readers, bar code readers integrated in devices such as, but not limited to digital cameras, cell phones, a computer mouse, keyboards, ATM machines, intelligent routers, switches, and hubs (Formerly Sarvega now Cisco) that can use XML to route and switch data packets that can represent 2D tagged bar coded eForms described in the present invention.

Uses of Various Embodiments of the Present Invention

Google Ads may be enhanced using one or more tagged and/or un-tagged bar codes included in the advertisement, which would facilitate an easy transfer of data.

A simple check may be enhanced using one or more tagged and/or un-tagged bar codes to encode additional information that MICR is not capable of.

The present invention's bar codes can be used as a chit, or bar coded money, to pay for a subscription for a publication such as the Wall Street Journal, which is honored at any location for the home-delivery price.

Another feature of the present invention is the use of "Dial-A-Web Page" as a shortcut method to access web pages that may or may not include tagged and/or un-tagged data summed up as a bar code. The "Dial-A-Web Page" method uses a web-based server containing a database that is accessed using a telephone number, then the database is queried using either the telephone number of a company or individual that are linked with a website that contains one or more webpages. The cellphone or wireless VoIP user can more easily surf the web using their device by using a telephone number, and then subsequently navigating a website using a number-based menu. Also, a specific web page within a website can be accessed using its own telephone number and number-based navigation menu. In addition to accessing website and/or specific web pages using a telephone number, numerical aids such a street addresses and/or zip codes can be used as an aid in the access of websites and/or specific web-pages. Also, the "Dial-A-Web-Page" database can be accessed using an icon provided by a cellphone service provider. In addition, the "Dial-A-Web-Page" database can be accessed using voice commands. Also, the "Dial-A-Web-Page" database can be accessed through the cellphone or wireless VoIP device's browser. See FIG. 22A for a representation of the current situation. See FIGS. 22B and 22C for a graphic description of the "Dial-A-Web-Page" feature of the present invention. In addition to using telephone numbers to access web sites, 9 to 19 digit zip codes, which offer more granularity for location, which can be used to access a website. In addition, NAC codes can be used as an alpha numeric physical addressing scheme to web page cross-reference. A further series of features related to ANI, telephone numbers, and cross-referenced addressing that can be added to the "Dial-A-Web-Page" is the information contained in U.S. Pat. No. 6,981,023 to Hamilton, et al, which is hereby incorporated in entirety by reference.

Another use of the present invention is as a HIPPA Compliant Fax System.

Another use of the present invention is the distribution of coupons, tickets, chits, e-money, etc, as one or more bar codes, which may or may not be tagged. These bar codes may be read using CCD or imager type bar code scanners to capture bar coded information directly off a video display or printed medium. A laser type bar code scanner can be used to capture barcoded information off printed medium. In addition, cell phones may include a bar code scanner that is capable of reading a video and or printed bar code, or only a printed bar code. In addition, several companies have enabled cell phone cameras to capture and decode bar codes.

Even though the Internet continues to shape the way in which order for goods and services and related financial transactions occur between parties, with the likes of eForms and using checking and savings accounts, and debit and credit cards, there is a persistence of individuals or businesses that continue to pay for goods and services by writing paper checks. The following is a short description of how the present invention can be used to enable the capture of order information from a bar code enabled order form that has been completed as an eForm, encoded with one or more tagged and/or un-tagged 1D and/or 2D bar codes, and snail mailed with a check or cash. It should be understood that the various aspects of the present invention described herein can be combined in various ways, as would be apparent to one skilled in the art having the benefit of this disclosure. It should also be appreciated that various modifications, adaptations, and alternatives may be made. It is of course not possible to describe every conceivable combination of components for purposes of describing the present invention. All such possible modifications are to be included within the spirit and scope of the present invention which is to be limited only by the following claims.

All references cited herein and all applications from which priority is claimed are hereby incorporated by reference in their entireties.

What is claimed is:

1. A method comprising:
    sending to a server, from a mobile device, an indication of a first location, wherein the first location is not determined by WiFi, cell location, or a Global Positioning System;
    receiving by the mobile device, from the server, an indication of a plurality of second locations, wherein at least one of the plurality of second locations is identified based at least in part on the indication of the first location; and
    displaying on the mobile device an indication of at least one document associated with at least one of the plurality of second locations, wherein the at least one document includes electronic information fields associated with tagged data, a first bar code configured to be used to earn a discount at the at least one of the plurality of second locations, and a second bar code comprising summed-up tagged data collected from electronic information fields of the at least one document.

2. The method of claim 1 wherein the at least one document is received by the mobile device via an SMS message.

3. The method of claim 1 wherein the at least one document is received by the mobile device in an email message.

4. The method of claim 1 wherein the indication of the first location comprises a ZIP code.

5. The method of claim 1 wherein each of the plurality of second locations is located within the first location.

6. A non-transitory computer-readable medium storing instructions configured to enable a computer to perform operations, the instructions comprising:
    instructions for receiving from a telephone device an indication of a first location;
    instructions for identifying, based at least in part on the indication of the first location, at least one second location;
    instructions for identifying documents associated with the identified at least one second location; and
    instructions for sending to the telephone device an indication of the identified documents, wherein at least a first document of the identified documents comprises a bar code comprising summed-up data extracted from electronic information fields of the first document.

7. The non-transitory computer-readable medium of claim 6 wherein the instructions for receiving comprise instructions for receiving from the telephone device an audible indication of the first location.

8. The non-transitory computer-readable medium of claim 6 wherein the instructions for receiving comprise instructions for receiving from the telephone device a text-based indication of the first location.

9. The non-transitory computer-readable medium of claim 6 wherein the first location is a highway exit.

10. The non-transitory computer-readable medium of claim 9 wherein the at least one second location is associated with at least one of a hotel, motel, restaurant, or gas station.

11. The non-transitory computer-readable medium of claim 6 wherein the first location is an airport, a train station, a sporting venue, or a convention center.

12. The non-transitory computer-readable medium of claim 11 wherein the at least one second location is associated with a bookstore, an automated teller machine, or a rest room.

13. A system, having a memory and a processor, for identifying documents associated with a location, the system comprising:
    a location receiving component configured to receive an indication of a first location;

a location identifying component configured to identify, based at least in part on the indication of the first location, at least one second location;

a document identifying component configured to identify at least one document associated with the identified at least one second location, wherein at least one identified document contains electronic fields associated with tagged data and a bar code comprising summed-up tagged data, the summed-up tagged data representing data collected from the at least one identified document; and a transmission component configured to transmit an indication of the identified at least one document wherein at least one of the components comprises computer-executable instructions stored in the memory for execution by the processor.

14. The system of claim 13 wherein the identified at least one document comprises a bar coded vendor discount associated with the at least one second location.

15. The system of claim 13 wherein the first location is not determined by WiFi, cell location, or a Global Positioning System.

16. The system of claim 13 wherein the indication of the first location comprises an airport code and concourse number.

17. The system of claim 16 wherein the location receiving component is configured to receive the indication of the first location in the form of speech data.

18. The system of claim 16 wherein the location receiving component is configured to receive the indication of the first location in the form of text data.

19. The system of claim 13 wherein the transmission component is configured to transmit the indication of the identified at least one document via an SMS message, an MMS message, or an email message.

20. The system of claim 13 wherein at least one identified document contains untagged data.

* * * * *

UNITED STATES PATENT AND TRADEMARK OFFICE
CERTIFICATE OF CORRECTION

PATENT NO. : 8,282,001 B2
APPLICATION NO. : 13/023767
DATED : October 9, 2012
INVENTOR(S) : Snyder et al.

Page 1 of 2

It is certified that error appears in the above-identified patent and that said Letters Patent is hereby corrected as shown below:

In the Specifications

In Column 2, Line 25, delete "stripe;" and insert -- stripe, --, therefor.

In Column 8, Line 60, delete "ANSI.1," and insert -- ANSI.1, EDI-INT, --, therefor.

In Column 8, Line 65, delete "file" and insert -- file. --, therefor.

In Column 10, Line 14, delete "documents" and insert -- documents. --, therefor.

In Column 12, Line 15, delete "etc" and insert -- etc. --, therefor.

In Column 14, Line 19, delete "Hewlet-" and insert -- Hewlett- --, therefor.

In Column 17, Line 48, delete "pact" and insert -- pad --, therefor.

In Column 18, Line 4, delete "is pictorial" and insert -- is a pictorial --, therefor.

In Column 19, Line 39, delete "Hewlet-" and insert -- Hewlett- --, therefor.

In Column 20, Line 59, delete "read)." and insert -- read. --, therefor.

In Column 25, Line 11, delete "MICR 1012," and insert -- MICR 1002, --, therefor.

In Column 25, Line 28, delete "document," and insert -- document. --, therefor.

In Column 25, Line 32, delete "1010'," and insert -- 1010, --, therefor.

In Column 25, Line 41, delete "messenger 1046," and insert -- messenger 1047, --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,282,001 B2

In Column 25, Line 52, delete "invention" and insert -- invention. --, therefor.

In Column 26, Line 12, delete "utoswitch," and insert -- autoswitch, --, therefor.

In Column 26, Line 20, delete "37-GUST" and insert -- 37-CUST --, therefor.

In Column 26, Line 48, delete "peelit" and insert -- peel it --, therefor.

In Column 42, Line 13, delete "useful" and insert -- useful. --, therefor.

In the Claims

In Column 45, Line 14, in Claim 13, delete "document" and insert -- document, --, therefor.